March 29, 1932.  J. S. DONALDSON  1,851,004
SHAPING MACHINE
Filed Oct. 5, 1926   14 Sheets-Sheet 5
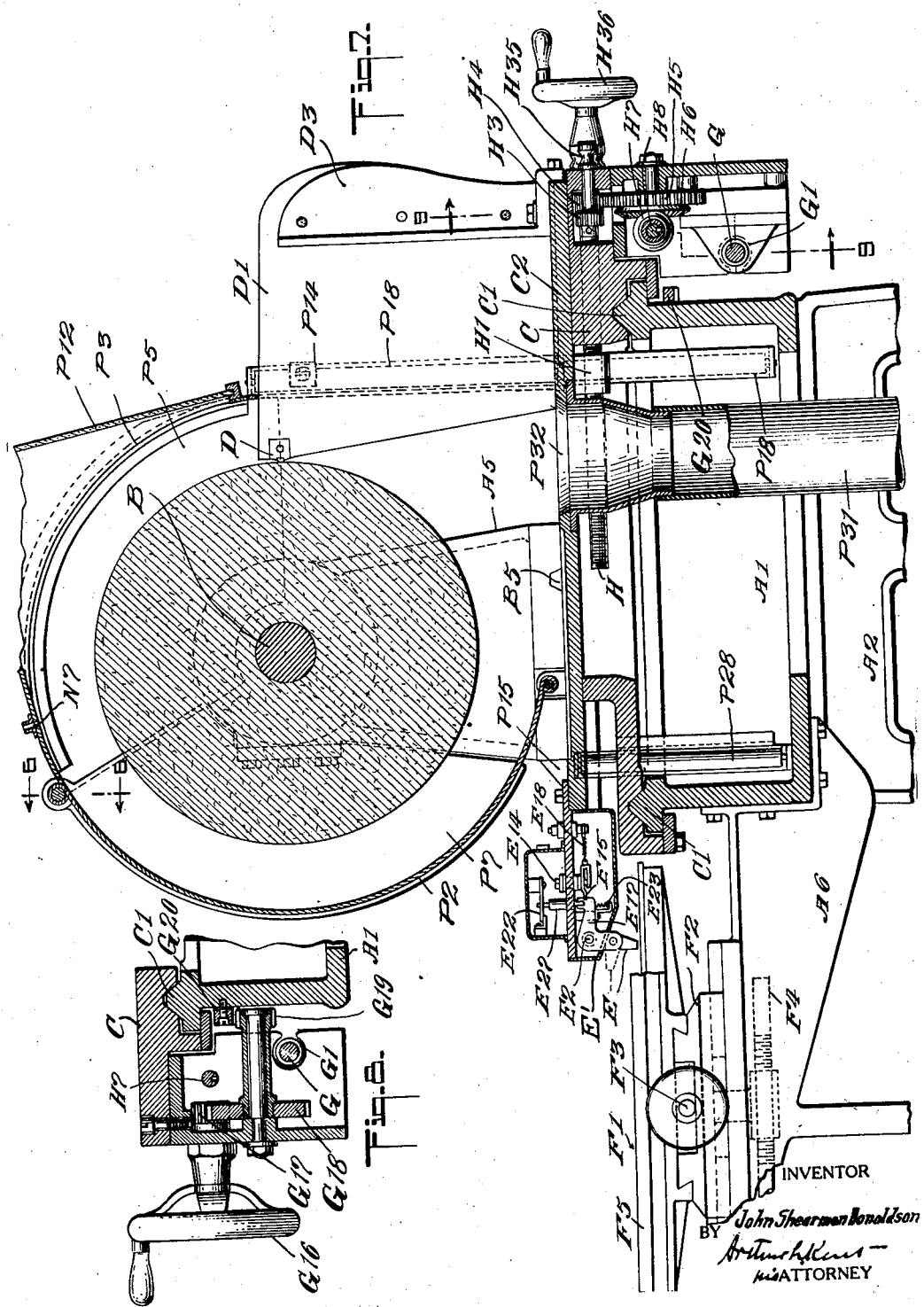

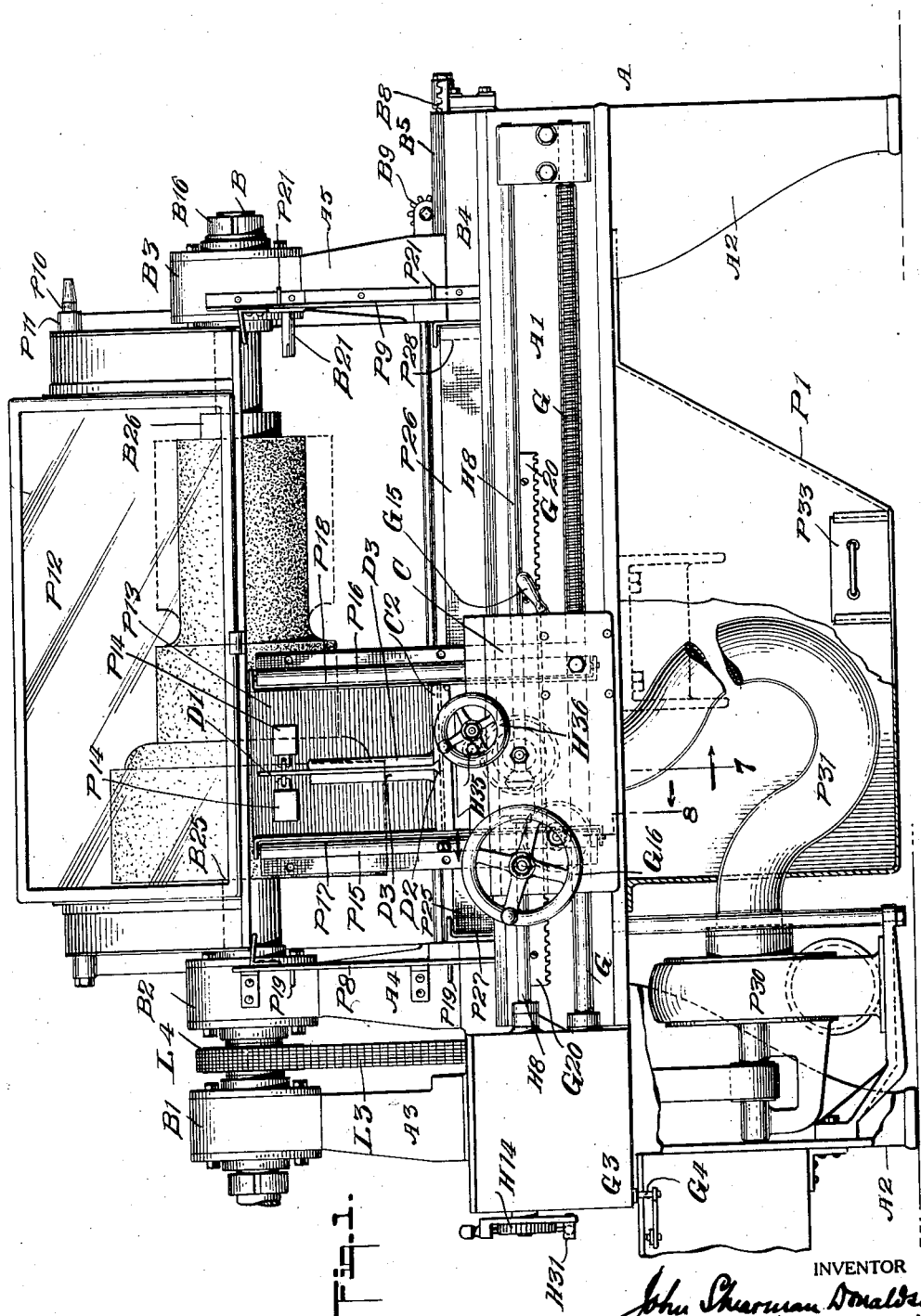

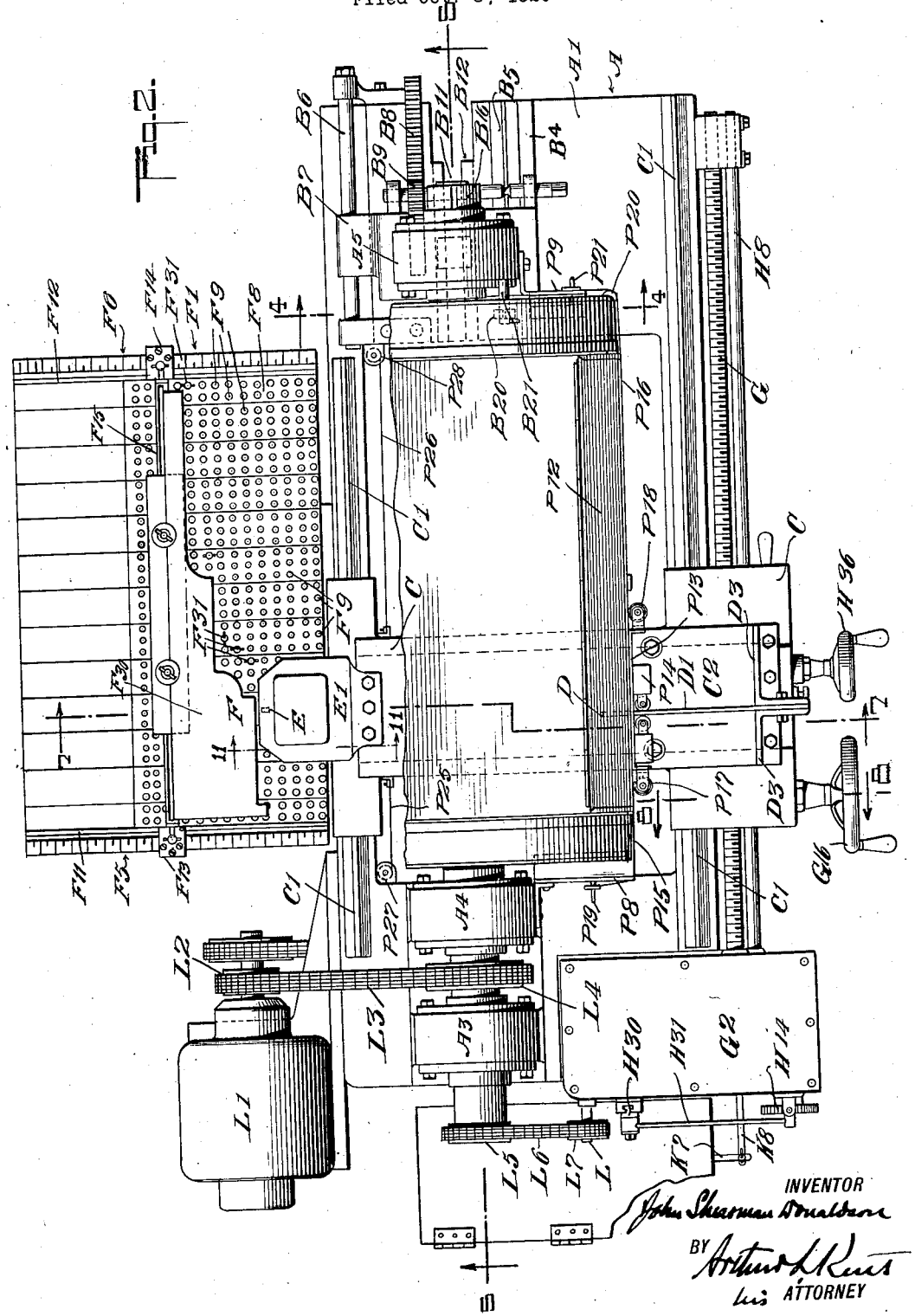

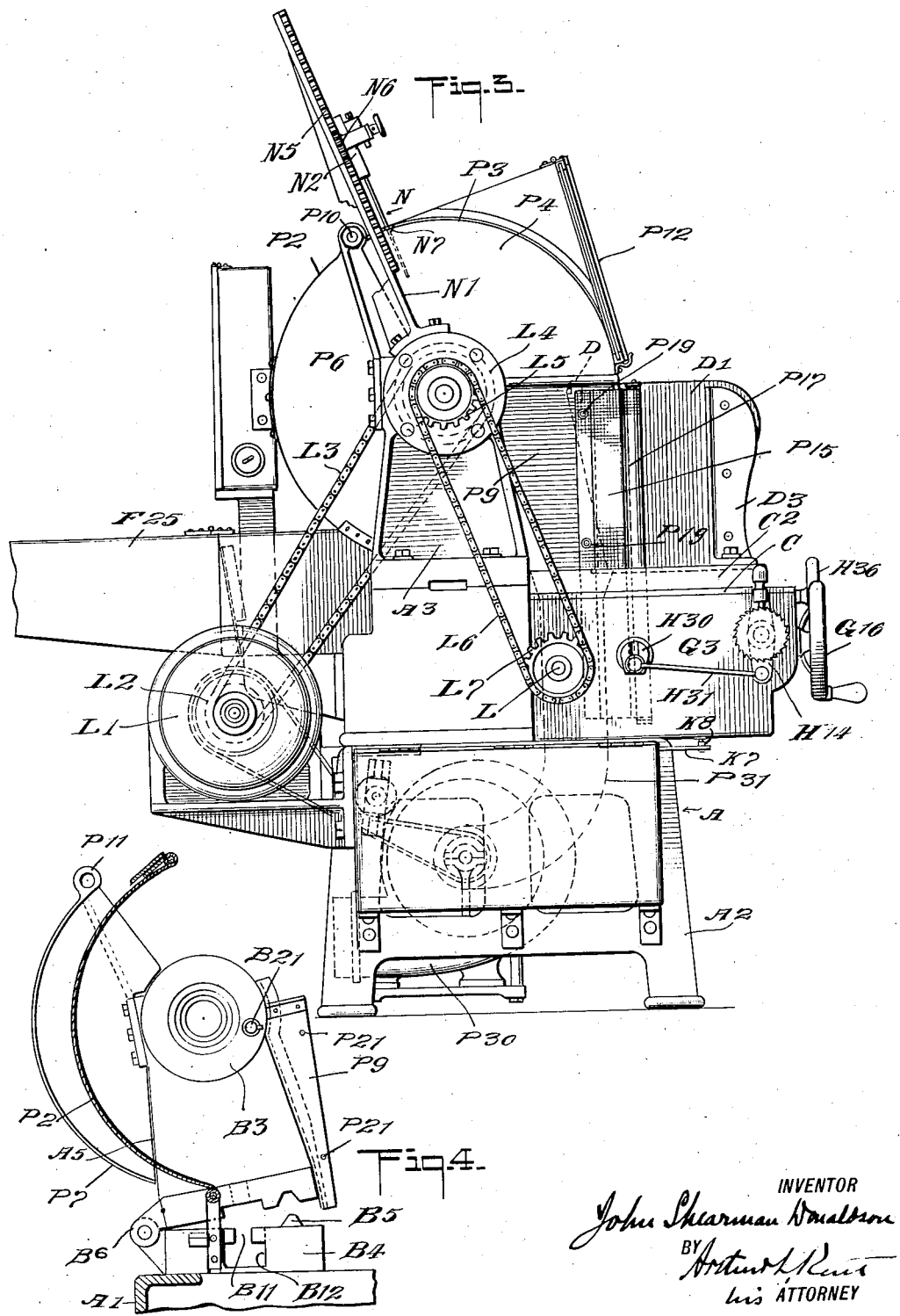

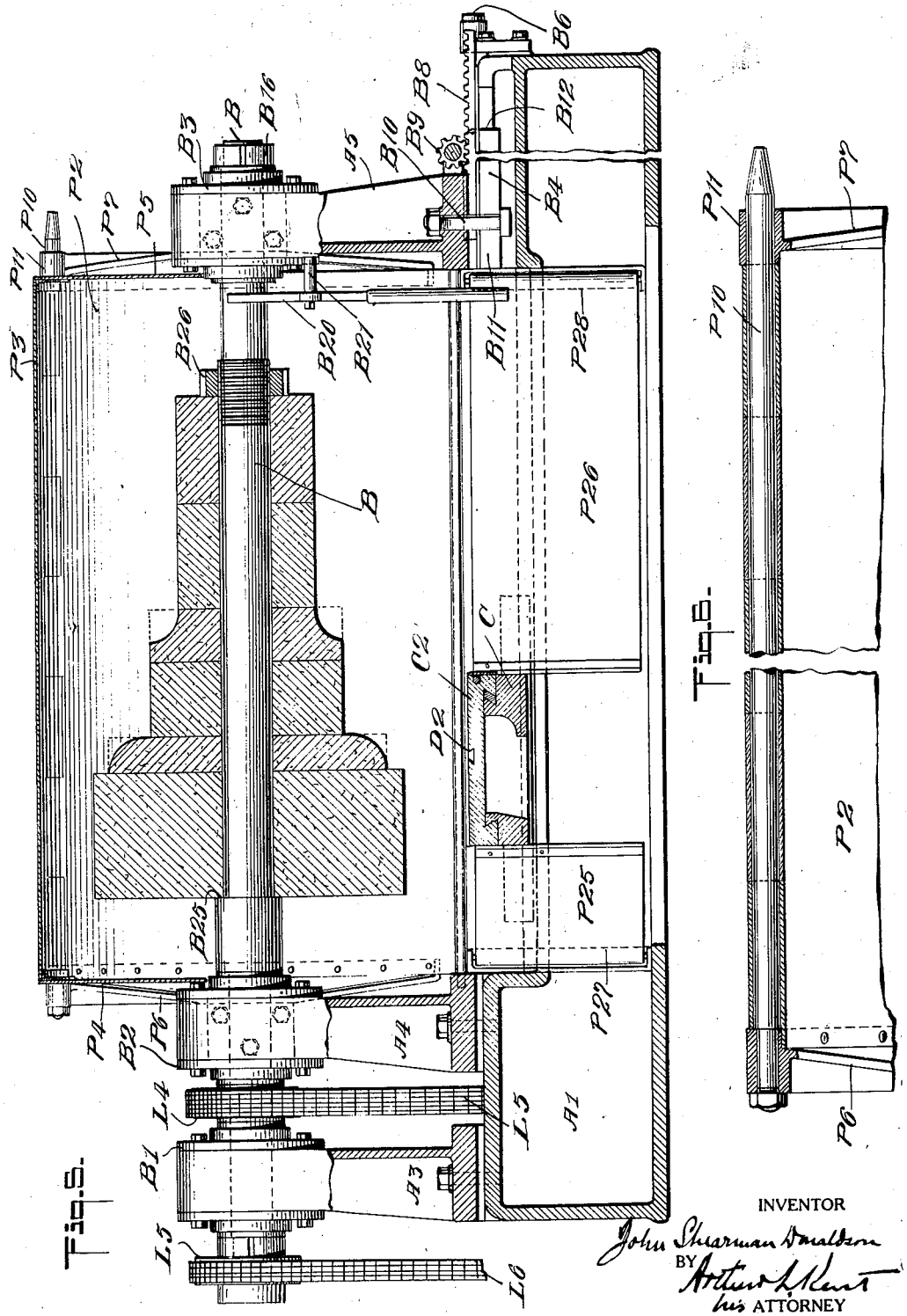

March 29, 1932. J. S. DONALDSON 1,851,004
SHAPING MACHINE
Filed Oct. 5, 1926 14 Sheets-Sheet 6
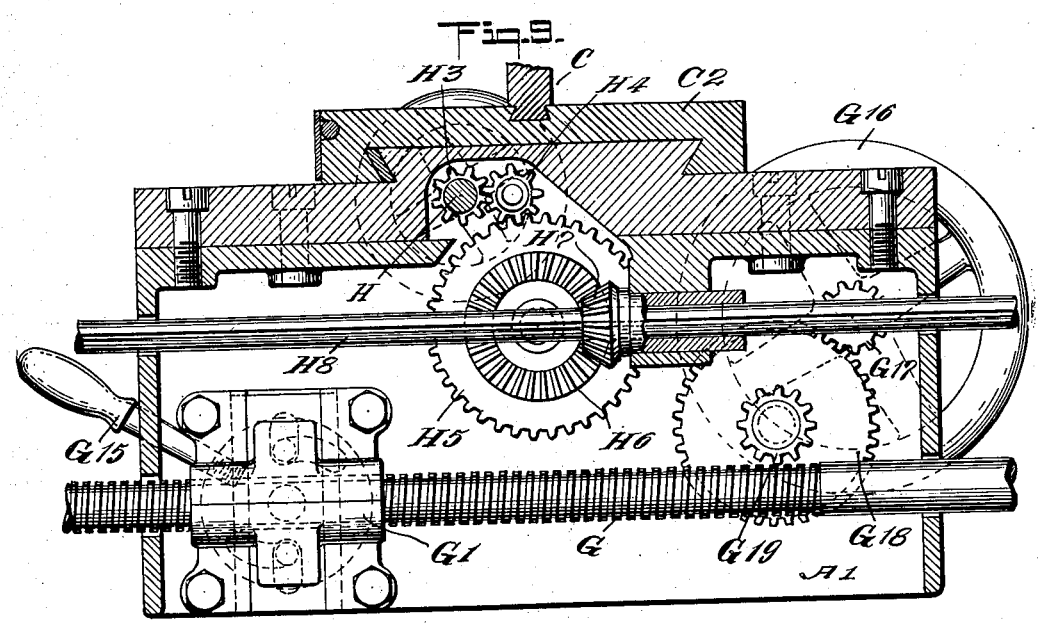
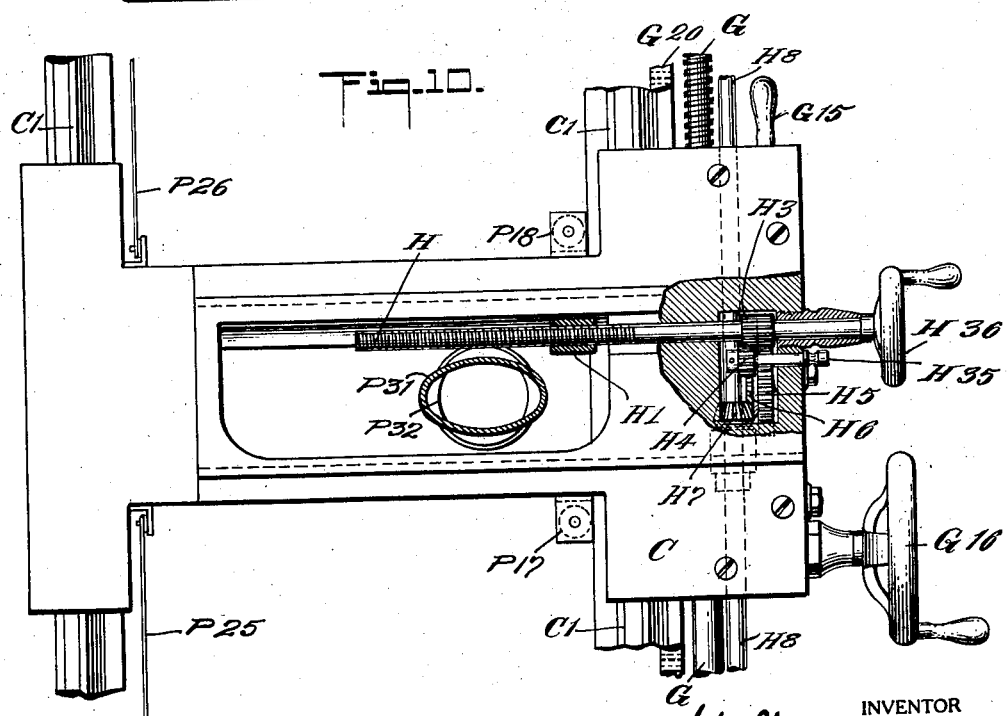

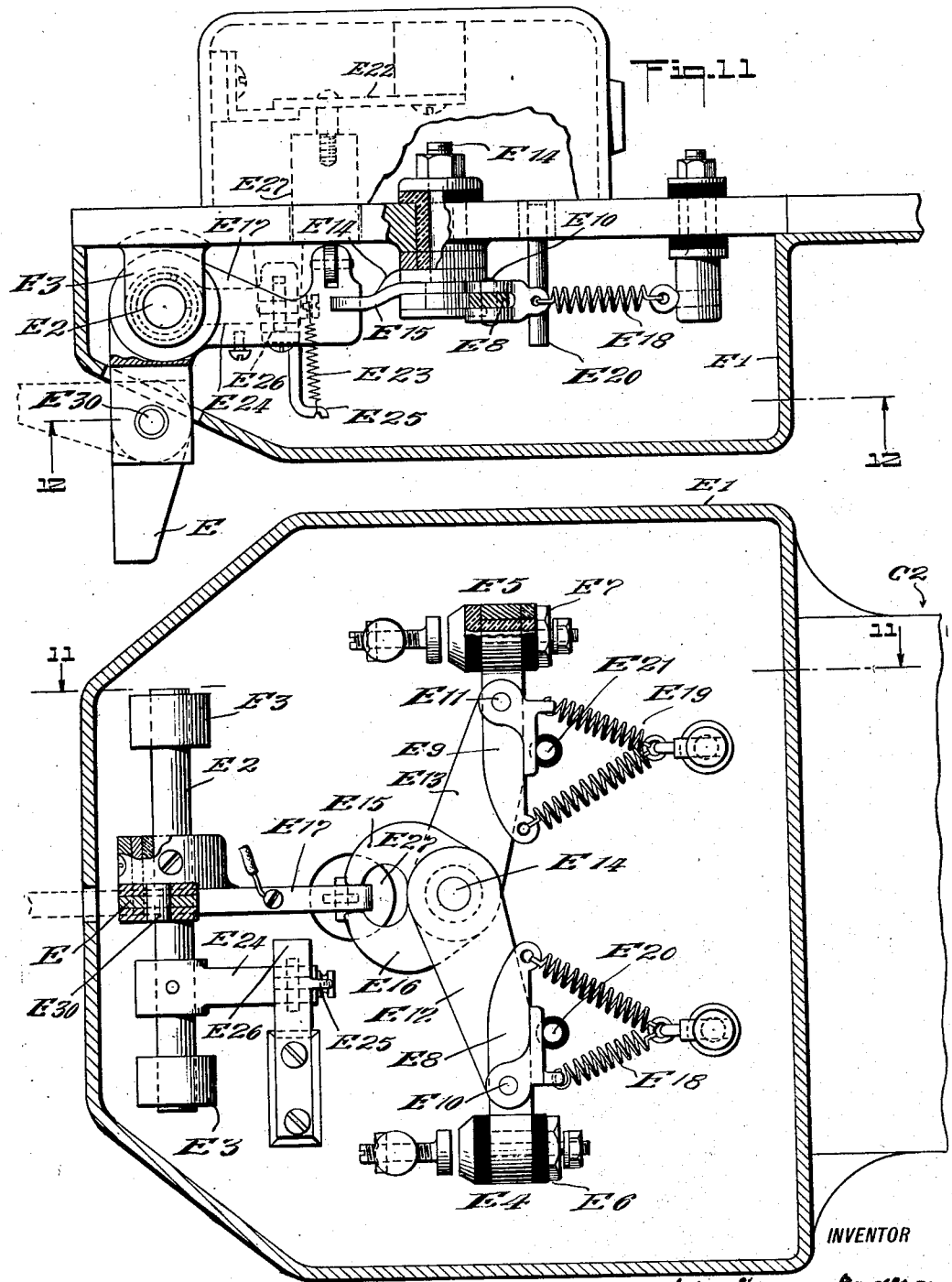

March 29, 1932.  J. S. DONALDSON  1,851,004

SHAPING MACHINE

Filed Oct. 5, 1926  14 Sheets-Sheet 8

INVENTOR
John Shearman Donaldson
BY Arthur L Kent
his ATTORNEY

March 29, 1932.   J. S. DONALDSON   1,851,004
SHAPING MACHINE
Filed Oct. 5, 1926   14 Sheets-Sheet 9
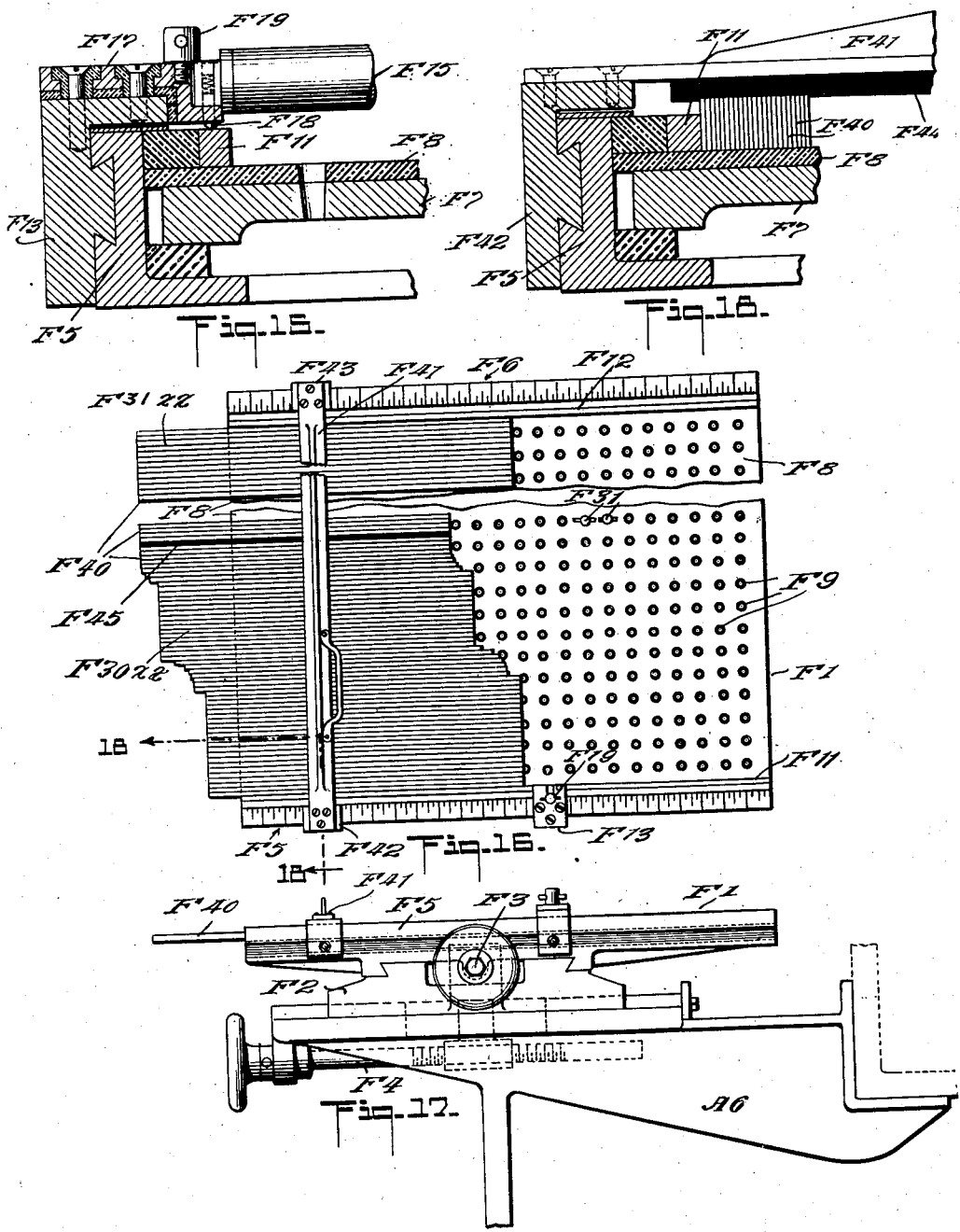

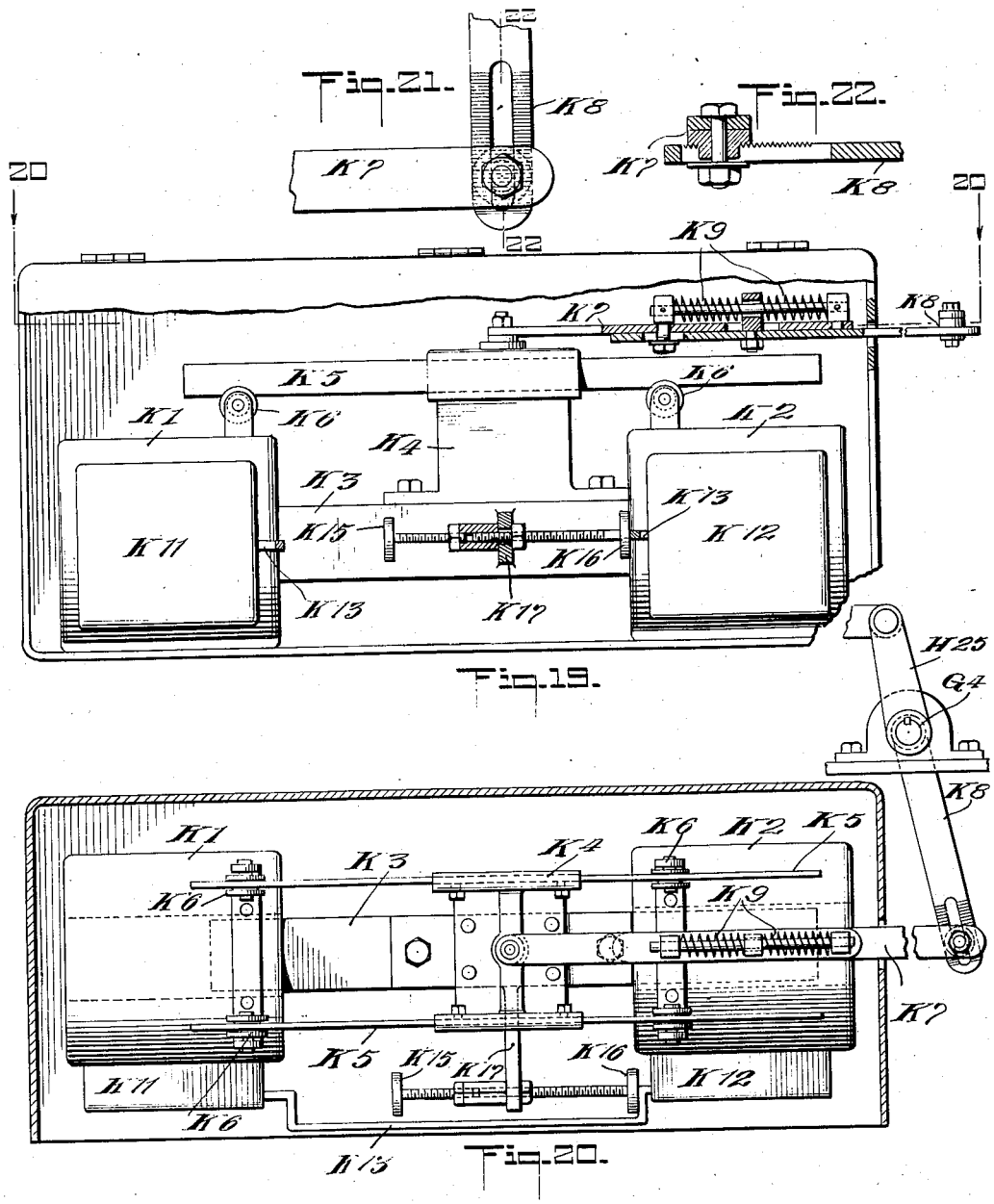

March 29, 1932. J. S. DONALDSON 1,851,004
SHAPING MACHINE
Filed Oct. 5, 1926 14 Sheets-Sheet 11
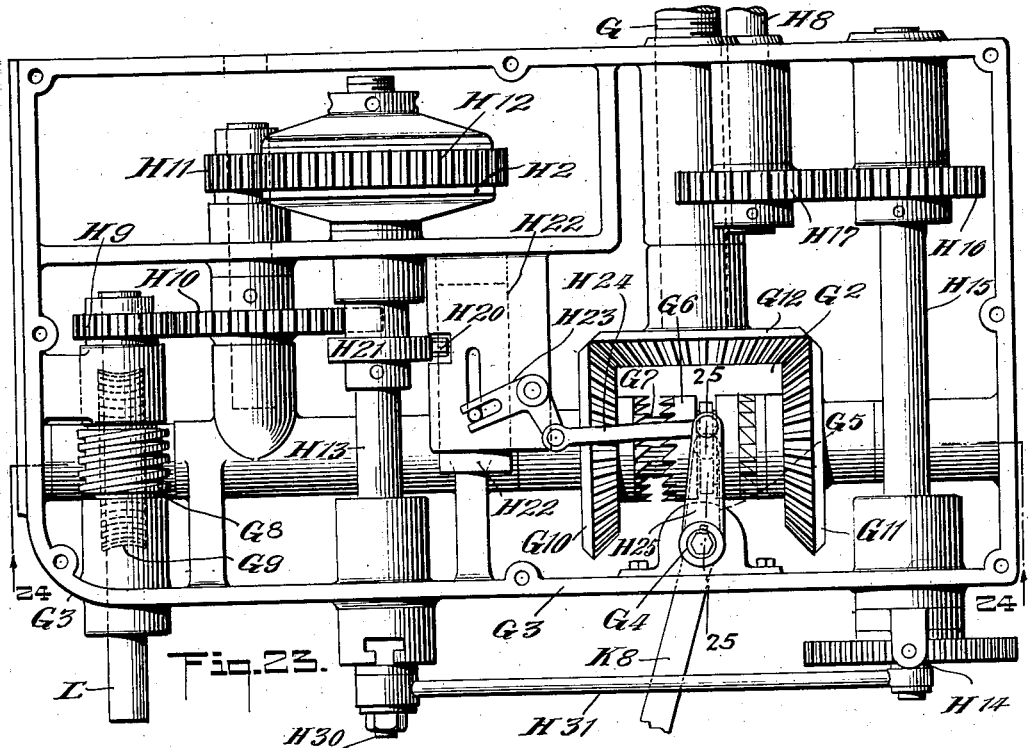
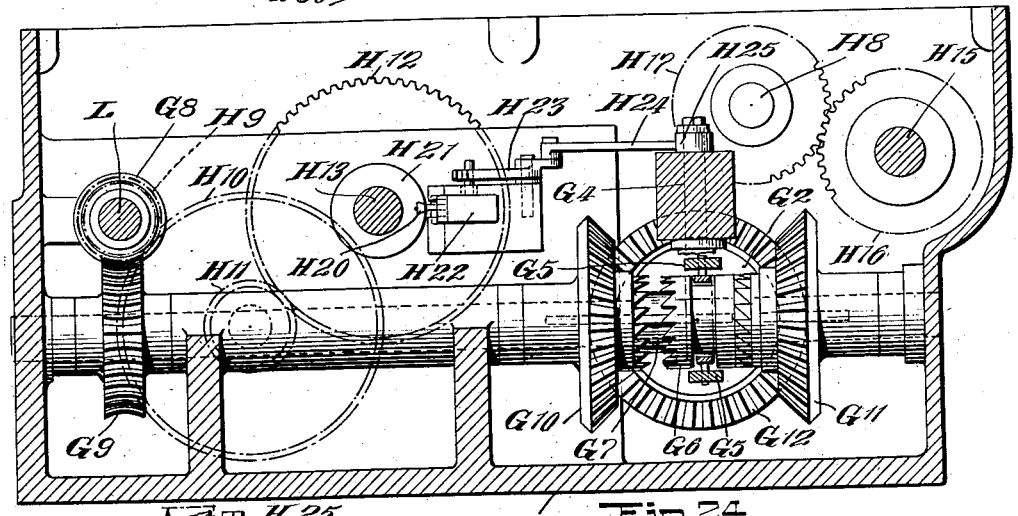
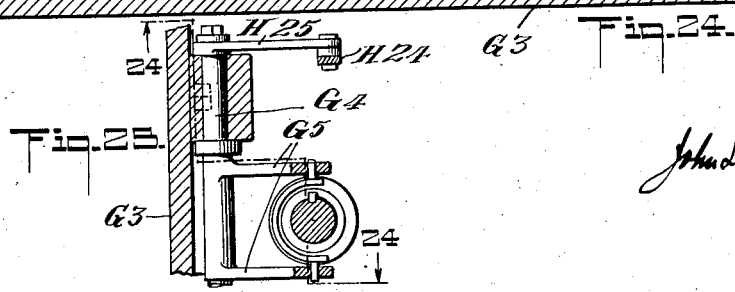
INVENTOR
John Shearman Donaldson
BY
his ATTORNEY

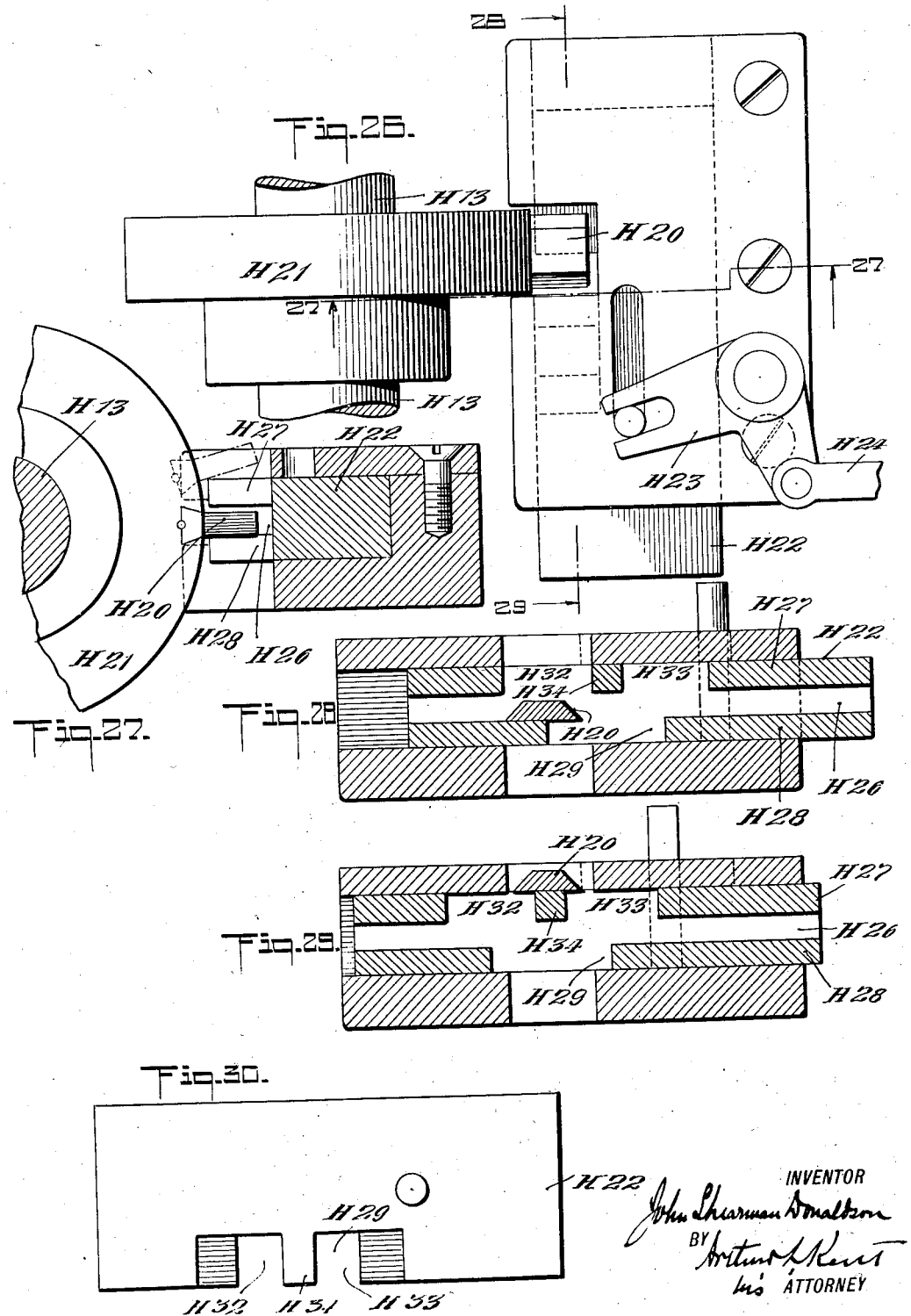

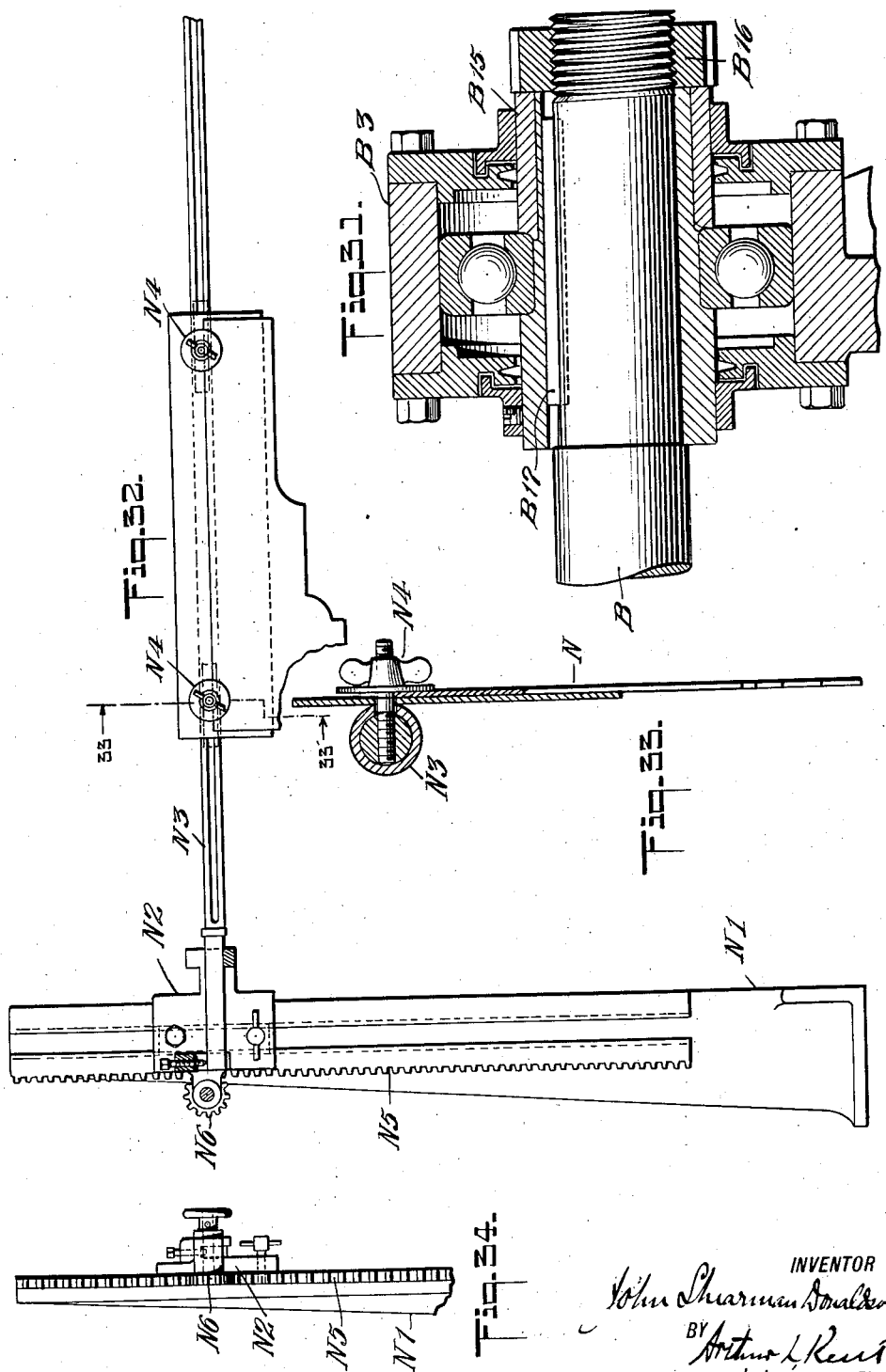

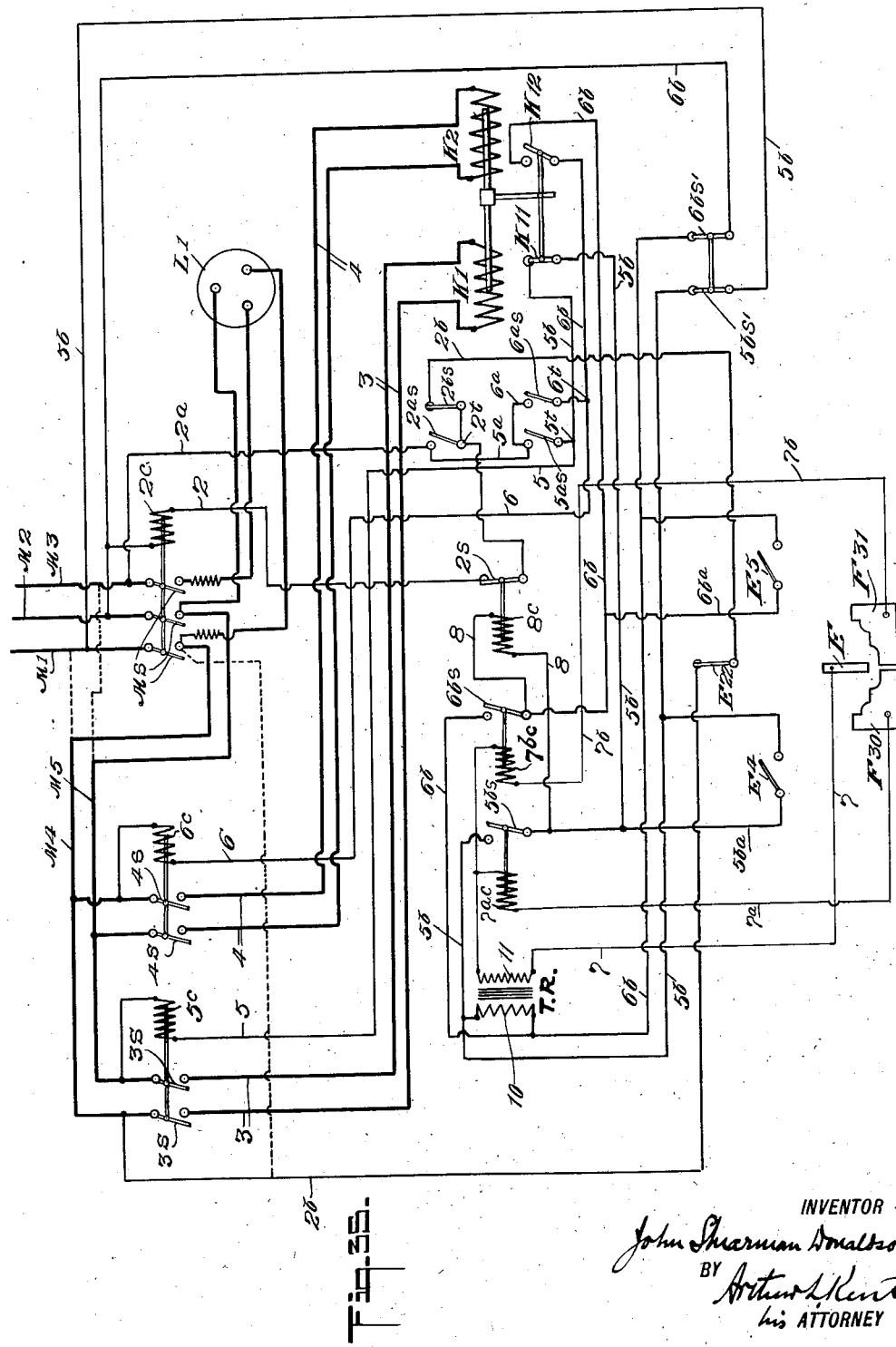

Patented Mar. 29, 1932

1,851,004

UNITED STATES PATENT OFFICE

JOHN SHEARMAN DONALDSON, OF NEW YORK, N. Y.

SHAPING MACHINE

Application filed October 5, 1926. Serial No. 139,587.

This invention relates to automatic shaping machines, and aims to provide an improved machine for cutting or otherwise forming the work automatically in accordance with a pattern.

The invention relates particularly to the type of machine in which a cutting or other tool is mounted on the cross slide of a carriage, so that the tool may be moved in two directions at right angles to each other, and in which the cross slide carries also a feeler which cooperates with a pattern to guide the movements of the tool. In such machines, the movement of the tool along the surface of the work is known as a traversing movement, while movement of the tool directly toward or away from the work is termed a feeding movement. When the machine is of the lathe type, the traversing movement is obtained by moving the tool carriage parallel to the axis of the work, and the feeding movement is obtained by moving the cross slide of the tool carriage toward or away from the axis of the work.

In all previous automatic machines of this character, so far as I am aware, the feeler and pattern have been used to control automatically the feeding movement of the tool during the traverse of the tool, in such manner as to make the tool move during each cut in a path which has substantially the same shape as the outline of the pattern. This arrangement possesses serious disadvantages, in that it involves much waste of time when the original form of the work is materially different from its final shape, as in this case all the initials cuts strike the work only in line with those parts of it which are to be cut most deeply in its final form. A further disadvantage of such machines is that they cannot shape the work in accordance with patterns whose outline contains right angle corners.

The present invention does away with these disadvantages by utilizing the pattern and feeler to control the length of each traverse of the tool. Whenever the feeler comes in contact with the pattern, the direction of the traversing movement is reversed, and at each reversal of the traversing movement, the tool is fed in slightly toward the work. As a result, the work is given a shape corresponding to that of the pattern by means of a series of straight parallel cuts. But little time need be wasted, since in most cases the tool may be controlled so that it will be cutting throughout substantially all of each of its traversing movements. Furthermore, the presence of right angle corners on the pattern in no way interferes with the operation, and such corners are correctly reproduced on the work.

A further feature of the present invention consists in obtaining accurate control of the tool by the pattern by doing away with the lag between contact of the feeler with the pattern and control of the tool which has existed in some previous machines. Such lag has resulted from the fact that it has been customary to rely upon a movement of the feeler in its holder, caused by pressing it against the pattern, to control the movement of the tool. In accordance with the present invention, the control of the tool follows substantially instantaneously when the feeler touches the pattern. This result is obtained by making both the feeler and the pattern of electrically conductive material, and connecting them as contact terminals in control circuits, and utilizing a flow of electric current in such circuits to cause the actuation of the mechanism which controls the movements of the tool. A mere touching of the feeler against the pattern is, therefore, sufficient to cause the operation of the controlling mechanism, and the lag heretofore caused by pressing the feeler against the pattern sufficiently to alter its position in its holder is eliminated.

While the features of the invention to which reference has been made may advantageously be applied to various automatic cutting or grinding machines, such, for example, as lathes or planing machines for shaping various materials, the invention possesses peculiar advantages when incorporated in a machine for dressing grinding wheels and is believed to produce the first successful automatic machine for this purpose.

The invention involves many other important novel features, all of which may best be understood from a detailed description of a practical machine for dressing grinding wheels embodying the invention and illustrated in the accompanying drawings, in which:—

Fig. 1 is a front elevation of the whole machine;

Fig. 2 is a plan view of the machine, with parts of the casing broken away or removed and with the pattern table cover removed;

Fig. 3 is a left end elevation of the machine;

Fig. 4 is a partial transverse section, taken on the line 4—4 of Fig. 2, and showing the movable support for the right-hand end of the work shaft;

Fig. 5 is a longitudinal sectional view of the upper part of the machine on a larger scale than Fig. 1 looking from the front and taken on the line 5—5 of Fig. 2;

Fig. 6 is a fragmentary sectional view taken on the line 6—6 of Fig. 7, showing the hinge of the casing;

Fig. 7 is a transverse sectional view of the upper portion of the machine, taken on the line 7—7 of Fig. 2 and line 7 of Fig. 1, but on a larger scale and omitting the pattern table casing;

Fig. 8 is a fragmentary sectional view looking from the right-hand end of the machine and showing the front part of the tool carriage sectioned on the line 8—8 of Fig. 1 and Fig. 2;

Fig. 9 is a sectional view looking from the back of the machine and showing on a larger scale the front part of the tool carriage sectioned on the line 9—9 of Fig. 7;

Fig. 10 is a plan view, on the scale of Fig. 7, of the tool carriage, with parts broken away and parts above the tool carriage omitted;

Fig. 11 is a view looking from the left hand end of the machine, sectioned on the line 11—11 of Fig. 2 and showing the feeler and its mounting and associated parts in elevation on a larger scale;

Fig. 12 is a bottom view of the parts shown in Fig. 11 sectioned on the line 12—12 of Fig. 11;

Fig. 15 is an enlarged detail section on the line 15—15 of Fig. 13;

Fig. 16 is a broken plan view of the pattern table showing a third type of pattern thereon and corresponding modifications in the means for holding the pattern.

Fig. 17 is a view in elevation of the pattern table looking from the left hand end of the machine and showing the pattern table carrying the type of pattern shown in Fig. 16;

Fig. 18 is an enlarged detail section taken on the line 18—18 of Fig. 16 and showing one of the slides carrying a clamp for the type of pattern shown in Fig. 16;

Fig. 19 is a view, on a larger scale and looking from the left hand end of the machine, of the solenoid box with its hinged cover broken away and showing the parts within the box, partly in section.

Fig. 20 is a plan view of the parts shown in Fig. 19 sectioned on the line 20—20 of Fig. 19;

Fig. 21 is a detail plan view showing part of the linkage between the solenoids and the reversing gear;

Fig. 22 is a detail section on the line 22—22 of Fig. 21;

Fig. 23 is a plan view on a larger scale showing the parts within the gear box, the cover of the box being removed;

Fig. 24 is a view taken on line 24—24 of Fig. 23 and line 24—24 of Fig. 25 looking from the left-hand end of the machine and showing parts within the gear box;

Fig. 25 is a fragmentary sectional view taken on the line 25—25 of Fig. 23;

Fig. 26 is an enlarged plan view of those parts in the gear box which control the feeding movement of the tool;

Fig. 27 is a vertical section on the line 27—27 of Fig. 26;

Figs. 28 and 29 are vertical sections on the line 28—29 of Fig. 26 showing different positions of the feed control parts;

Fig. 30 is a plan view of the feed control slide;

Fig. 31 is an enlarged axial section of the bearing at the right hand end of the work shaft;

Fig. 32 is a front elevation of the mounting for a templet to be used when the machine is controlled manually, this mounting being also shown at the top of Fig. 3;

Fig. 33 is an enlarged section on the line 33—33 of Fig. 32;

Fig. 34 is a fragmentary edge elevation of a part of the mounting shown in Fig. 32; and Fig. 35 is a diagram of the electrical circuits of the machine.

Figure 13:
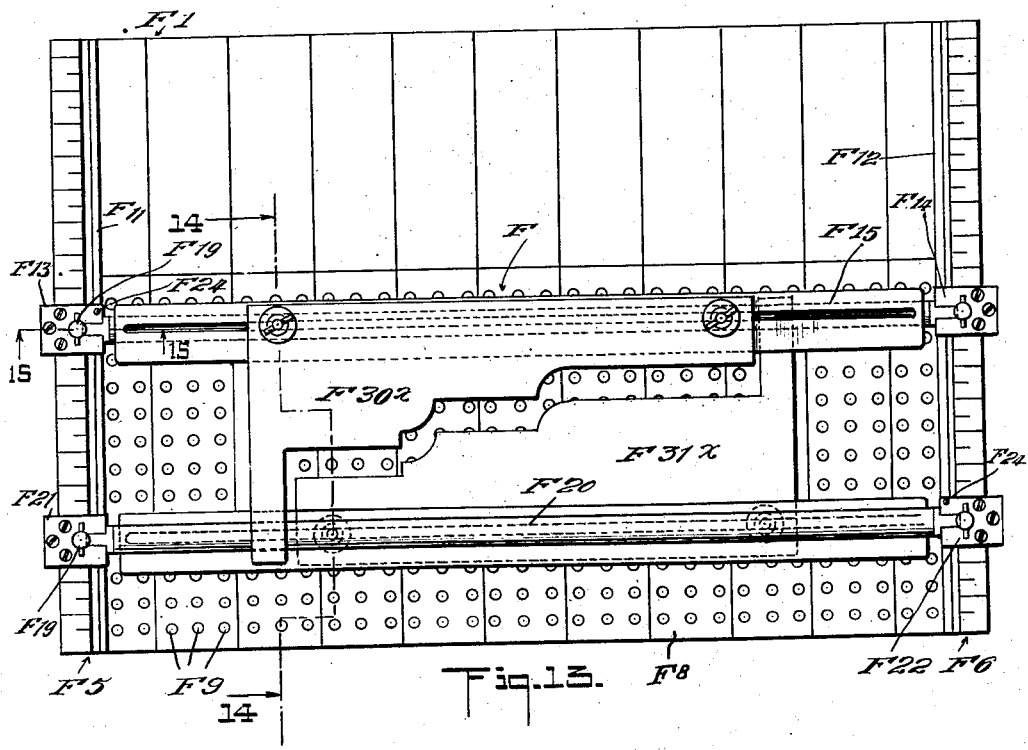
Fig. 13 is a plan view of the pattern table showing the two parts of the pattern each formed by a short metal plate.

The dressing machine shown in the drawings is a machine of the lathe type. It has a framework A comprising a hollow, box-like table or bed A1 supported on legs A2. Standards A3, A4, A5 rising from the table carry bearings for a power-driven mandrel or shaft B on which the work is carried. On the table A1 are two longitudinal ways C1 on which the tool carriage C is slidably mounted. The tool carriage extends across the table and carries a cross slide C2 beneath the work shaft B. The tool D is carried by a tool holder D1 mounted on the cross slide near the front of the machine. At the rear end of the cross slide is mounted a feeler E which moves with the tool and which cooperates with a pattern F carried on an adjusable pattern table F1 mounted at the rear of the bed A1 of the machine. The top of the bed A1 between the ways C1 and between the standards A3 and A4 at one end and the standard A5 at the other end is cut away, so that the top of the bed is open beneath the work. The usual traverse worm G (Figs. 9, 10) extending lengthwise of the machine and cooperating with a nut G1 on the tool carriage is provided to cause the traversing movements of the tool. The usual feed worm H carried by the carriage and cooperating with a nut H1 on the cross slide is provided to cause feeding movements of the tool. The traverse worm G is driven through a reversing clutch G2, which is electrically controlled by a flow of current in circuits which include as contact terminals the feeler E and the parts of the pattern F, in such manner that the direction of movement of the carriage is reversed from left to right when the feeler strikes the left-hand part of the pattern and from right to left when the feeler strikes the right-hand part of the pattern. The feed worm H is driven through a friction clutch H2 and is held against movement except at the moment of the reversal of the movement of the carriage. At each such reversal, the feed worm is turned an amount which may be adjusted, so that at each cut the tool is slightly nearer the axis of the work than on the previous cut. The reversing clutch G2 (Fig. 23) and friction clutch H2 and cooperating parts are located in a gear box G3 at the left hand end of the bed A1.

The pattern table F1 (Figs. 2, 7 and 13 to 17) is mounted on a bracket A6 extending rearwardly from the main bed A1 of the machine. The table is mounted to slide longitudinally of the machine on a cross slide F2 which is mounted to slide transversely of the machine on the bracket A6, the table being moved longitudinally of the machine by means of a worm shaft F3 on the cross slide F2 engaging a nut on the table, and the cross slide and table being moved transversely of the machine by means of a worm shaft F4 on the bracket A6 extending through a nut on the cross slide. The worm shafts F3 and F4 are provided with hand wheels as shown in Figs. 7 and 17, by turning which the position of the table may be adjusted as desired. The table is provided at its opposite transverse side edges with upwardly extending flanges F5 and F6, and is provided between the flanges with a flat conducting plate F7 which is insulated from the table and is covered by a top plate F8 of insulating material. The plates F8 and F7 are formed with a multiplicity of closely spaced sockets F9 for receiving contact plugs as hereinafter explained. Extending adjacent the edge flanges F5 and F6 and insulated therefrom are two contact strips or rails F11 and F12 of conducting material. The flanges F5 and F6 are formed to serve as guideways for slides F13 and F14 which carry a metal cross bar F15 extending across the table longitudinally of the machine. Reduced flattened ends of the cross bar are seated in receiving slots in insulated metal cap pieces F17 carried by the slides F13 and F14. One of the cap pieces, as that carried by the slide F13, is provided with a spring contact F18 which bears on the contact rail F11, thereby electrically connecting the cross bar F15 with the rail F11. To insure good contact of the end of the bar F15 in its seat in this cap piece F17, a thumb screw F19 is provided to screw into the cap piece and bear down against the end of the bar, as shown in Fig. 15. As shown in Fig. 2, the pattern table is provided with only one cross-bar, but when using a pattern having both right and left hand members formed by templets, as shown in Fig. 13, a second cross bar F20 is provided carried by slides F21 and F22 which are like the slides F13 and F14 except that in this case it is the right hand slide F22 which has its cap piece provided with a spring contact device F24 bearing against the rail F12. The cross bar F15 will thus be electrically connected with the rail F11 and insulated from the rail F12, and the cross bar F20 will be electrically connected with the rail F12 and insulated from the rail F11. The conducting plate F7 is electrically connected with the contact rail F12, and the two rails F11 and F12 are connected one in each of two control circuits, of each of which one of the pattern members hereinafter described forms a terminal and which have a common terminal in the feeler E, so that when the feeler makes contact with either pattern member, one of these control circuits will be closed. A hinged cover F25 (Fig. 3) is provided for the pattern table, which may be swung upward to give access to the table.

The pattern, or means which serves to determine the points of reversal of the successive traversing movements of the tool carriage to form the work to the desired shape, consists of right and left hand parts each made wholly or partly of conducting material and electrically connected, when mounted on the pattern table, to the contact rails F11 and F12 respectively. As shown in Fig. 2, the pattern has a left hand member, or part, F30 consisting of a sheet metal templet secured to and carried by the cross bar F15, so that it is electrically connected to the rail F11, and a right hand part consisting of a number of separate plugs F31 inserted in some of the sockets F9 so that they are electrically connected through the plate F7 with the rail F12. The templet F30 is the pattern proper, its front edge being shaped according to the shape to which the work is to be formed, and the plugs F31, forming the right hand pattern member in this case, serve merely to determine the points at which the traversing movement of the carriage is reversed from right to left after the tool has completed a cutting movement to the right. The plugs are most desirably arranged in such suitable sockets F9 as to suitably limit the waste, or non-cutting, movement of the tool.

Figure 14:
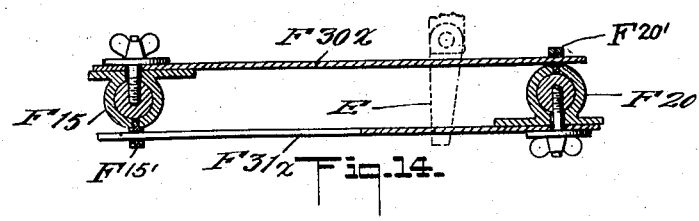
Fig. 14 is a detail sectional view of parts shown in Fig. 13 taken on the line 14—14 of Fig. 13.

As shown in Figs. 13 and 14, the right-hand member of the pattern consists of a sheet metal templet $F31^x$ mounted on the cross bar F20 and insulated from the cross bar F15 by insulating material F15' secured to the lower side of said cross bar, and the left hand member is formed by a sheet metal templet $F30^x$ like the templet F30 of Fig. 2 except that the extreme left hand portion of the templet is extended to be supported by insulating material F20' on the cross bar F20 so that it does not make electrical contact with the cross bar F20. Similarly, the extreme right hand end portion of the plate $F31^x$ is extended and supported by the bar F15 without being in electrical contact therewith. The left hand member $F30^x$ of the pattern carried by the bar F15 is thus in electrical contact with the rail F11, and the right hand member $F31^x$ of the pattern carried by the bar F20 is in electrical contact with the rail F12. As in Fig. 2, the forward edge of the plate $F30^x$ determines the shape to which the work is to be formed, and the plate $F31^x$ serves, with a pattern such as shown in Fig. 13 merely to limit the amount of continued movement of the carriage and tool to the right after each cutting stroke to the right has been completed, but in order to avoid loss of time through unnecessary waste movement of the carriage and tool after the tool leaves the surface of the work on each movement to the right with a pattern such as shown, the templet $F31^x$ desirably has its rear edge shaped to correspond substantially to the shape of the front edge of the templet F30, and the two templets are relatively so set, as shown in Fig. 13, that while the necessary space is left between the edges of the templets for movement of the feeler, unnecessary waste movement of the carriage and tool is avoided. It is apparent that when templets are used for both the right hand and left hand members of the pattern, the contact plugs F31 are not required, and the conducting plate F7 and insulating plate F8 providing the sockets F9 may be omitted.

Figure 13A:
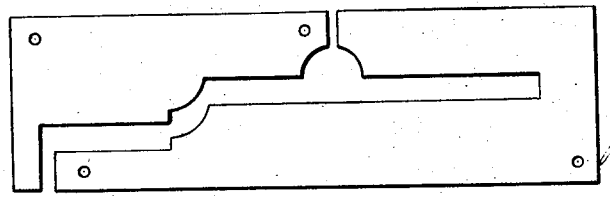
Fig. 13A is a detail view showing pattern members for forming the work to the shape indicated by the dotted lines in Fig. 1.

The patterns shown in Figs. 2 and 13 cause the work to be shaped as shown by full lines in Figs. 1 and 5. If the work is to be shaped with an intermediate part of least diameter and parts of greater diameter on each side of such part of least diameter, then the points of reversal of the carriage at the end of its traversing movements to the right must be accurately controlled by the pattern for shaping the portion of the work to the right of the part of least diameter, and this is accomplished by providing a templet forming the right hand member of the pattern with a contact edge of the proper shape. For example, for forming the work with its right hand end portion of the shape indicated by dotted lines in Fig. 1, two templets of the shape shown in Fig. 13A would be used.

Figs. 16, 17 and 18 show a pattern made up of a number of thin metal strips F40 placed on edge on the insulating top F8 of the pattern table beneath a clamping bar F41 which is carried by slides F42 and F43 mounted on the table flanges F5 and F6. Insulating material F44 on the under side of the bar F41 bears against the top edges of the strips F40 to hold them in place and to insulate them from the bar. The strips are arranged so that their front ends form the pattern outline which is to be formed on the work, and the strips with a strip of insulating material F45 inserted at the deepest point of the outline of the pattern fill the space between the contact rails F11 and F12. The strips to the right of the insulating strip F45 form a right hand pattern member $F30^{xx}$ which is in electrical contact with the contact strip F11, and the strips to the left of the insulating strip form a left hand pattern member $F31^{xx}$ which is in contact with the rail F12. Obviously, one or more of the contact plugs F31 might be inserted in the sockets of the insulated table top to form the right hand pattern member to cooperate with the pattern portion $F30^{xx}$. If a pattern formed only by strips F40, as shown in Figs. 16 and 18, is to be used, the sockets may, of course, be omitted from the table top, and the conducting plate F8 electrically connected with one of the contact rails F11 or F12 may also be omitted.

It should be noted that in all of the patterns shown the right and left hand members of the pattern are electrically separated but closely spaced at the deepest point of the outline of the pattern.

The feeler E carried by the cross slide C2 at the rear end thereof for cooperating with the pattern is made of conductive material. It is formed by a short bar or finger of conducting material mounted on and insulated from the rear end of the cross slide C2 and extending downward in position to make contact with a part of the pattern at the end of each traversing movement of the tool carriage. It is connected to form the common terminal of the two control circuits of which the other terminals are formed by the left and right hand pattern members respectively connected through rails F11 and F12 so that when the feeler makes contact with either part of the pattern a circuit will be closed to cause a reversal of the traverse movement of the tool carriage. The width of the feeler is sufficient to bridge the space between the right and left hand members of the pattern at the deepest point of the outline of the pattern, so that when the cutting of the work is completed the feeler will make contact with both parts of the pattern at the same time, and this results, as hereinafter described, in the closing of a circuit by which movement of all moving parts of the machine is stopped.

So far as the normal operation of the machine is concerned, the feeler might be rigidly mounted on the cross slide C2 of the tool carriage. Most desirably, however, the feeler is mounted so that it may have a limited movement relative to the cross slide, and such relative movement of the feeler with respect to the cross slide caused by pressing the feeler against the pattern is utilized to operate a safety switch, the operation of which results in the reversal of the traverse movement of the tool carriage. In this way damage to the work or to the tool or other parts of the machine which might occur through failure of the reversing mechanism to operate when the feeler touches the pattern because of the presence of dirt or corrosion or for any other reason is avoided. By the use of such safety switches, preferably controlling circuits of relatively high voltage so that the closing of the circuit would not be affected by the presence of slight corrosion or dirt on the contact surfaces, I am enabled safely to use a comparatively low voltage on the regular control circuits which include the feeler and the pattern, and thus avoid injurious arcing between the feeler and the pattern which would occur with the use of high voltage current.

The mounting of the feeler which I have found most desirable is illustrated in Figs. 11 and 12 which show the rear end of the cross slide and a box E1 depending therefrom. The feeler E is mounted on and insulated from a shaft E2 which is capable of both turning and sliding in bearings E3 depending from the cross slide. The sidewise movements of the feeler E and sliding of the shaft E2 with respect to the slide are utilized to operate emergency switches E4 and E5 forming part of control circuits equivalent in causing reversal of the movement of the tool carriage to the control circuits which are closed when the feeler touches either part of the pattern. The movable members E6 and E7 of the emergency switches E4 and E5 are mounted on levers E8 and E9 pivoted at E10 and E11 respectively to the outer ends of tong members E12 and E13 which are independently pivoted on a stud E14 and have their other ends E15 and E16 lying on opposite sides of an arm E17 extending rearwardly from the upper end of the feeler E. Pairs of springs E18, E19 urging the levers E8 and E9 against stop pins E20 and E21 serve normally to hold the switches E4 and E5 open and to hold the feeler E in its central position. The stud E11, the stop pins E20 and E21 and the studs to which the springs E18 and E19 are connected all have insulating mountings.

The feeler is normally held standing in the position shown in Fig. 11 under tension of a spring E23 which extends between the end of an arm E24 secured fast to the shaft E2 and a hook E25, this spring acting normally to hold the arm E24 against a stop bar E26 carried by a bracket depending from the slide C2. Excessive pressure pushing the feeler toward the front of the machine will overcome the tension of the spring E23, and the feeler will move backward swinging the arm E17 upward. Such upward movement of the arm E17 opens a normally closed emergency switch E22 through engagement with a block E27 of insulating material which hangs from the movable member of the emergency switch. The switch E22 is so connected that the opening of this switch serves to stop all movement of moving parts of the machine. Any further movement of the feeler E, therefore, such as would be caused by continued operation of the machine after the feeler has reached the deepest part of the outline of the pattern, or by any continued feeding movement of the slide when the feeler is in contact with a forwardly facing edge of the pattern, will cause an emergency stop of the machine.

In order that the feeler may be conveniently inserted between the two parts of a pattern with which it is to cooperate, such as the pattern shown in Fig. 13 for example, and that it may, if desired, be adjusted to a position in which it will not come into engagement with a pattern on the pattern table, the feeler is made so that its lower end portion or contacting part may be raised so as to pass over the pattern. For this purpose in the construction shown, the lower part of the feeler is pivoted to the upper portion thereof at E30 so that it may be turned rearwardly and upwardly into the position shown by dotted lines in Fig. 11. The construction is such, however, that the feeler cannot be turned forwardly with respect to its upper part from the operative position shown by full lines in Fig. 11.

The electric circuits which are closed by contact of the feeler with the right hand and left hand members of the pattern are utilized to control the energy supplying circuits of two aligned solenoids K1, K2 (Figs. 19–22) so that the bar K3, the ends of which form the cores of these solenoids, is drawn in one direction when the feeler contacts with one member of the pattern and in the opposite direction when the feeler contacts with the other member of the pattern. The core bar K3 is supported by a slide head K4 carried by parallel rails K5 which rest on grooved rollers K6. Movement of the head K4 is transmitted through a connecting rod K7 and arm K8 to a rock shaft G4 which carries a fork G5 (Figs. 23–25) by which the sliding member G6 of the traversing reversing clutch G2 is shifted. This clutch member G6 is splined on a shaft G7 which is driven by a power shaft L through a worm G8 and gear G9, and serves to lock to the shaft G7 one or the other of two bevel gears G10 and G11, mounted free to turn on the shaft, and both of which mesh with a bevel gear G12 mounted on the left hand end of the traverse worm G. It is apparent that when the clutch member G6 is shifted by the rocking of the shaft G4 by either solenoid, it reverses the direction of rotation of the traverse worm and consequently the direction of the traverse of the tool. An adjustable pivotal connection between the connecting rod K7 and arm K8 provides for varying the effective length of the arm K8 and thereby the throw of the shifting fork G5. In order that the clutch member G6 shall be moved and held against the coacting clutch members under yielding pressure, the connecting rod K7 is formed of two parts connected by means permitting a relative endwise movement between the parts and restrained from such movement by opposed cushion springs K9.

Associated with the solenoids are two electrical switches K11 and K12, the switch K11 being connected, as hereinafter described, in the energizing circuit of the solenoid K1, and the switch K12 being connected in the circuit of the solenoid K2. The movable members of the switches, which may be of any suitable construction, are connected by a rod K13, and are operated by adjustable push members K15 and K16 mounted on a bracket K17. The solenoid K2 having been energized to move the core bar K3 to the position shown in Figs. 19 and 20, as the core bar reaches the end of its movement the push member K16 opens the switch K12 and through the connecting rod K13 closes the switch K11; and as the core bar reaches the end of a movement in the opposite direction when attracted by the solenoid K1, the switch K11 is opened by the push member K15 and the switch K12 is closed.

The feed worm H (Figs. 7, 9 and 10) is connected through spur gears H3, H4 and H5 and a bevel gear H6 to a bevel gear H7 which travels with the tool carriage C but has a splined connection with a longitudinal shaft H8 mounted in bearings on the bed of the machine. This shaft H8 (Figs. 23, 24 and 3) is driven from the power shaft L through spur gears H9, H10, H11, H12, the friction clutch H2, shaft H13, an adjustable ratchet reducing mechanism H14 (Fig. 3), shaft H15, and spur gears H16 and H17. The driven member of the friction clutch and the shaft H13 to which it is secured are normally held against rotation by the engagement of a stud H20 on the periphery of a disk H21 on the shaft H13 with a slide H22. This slide is connected through a bell crank lever H23 and link H24 with an arm H25 on the clutch shifting rock shaft G4, so that it is moved alternately in opposite directions at each reversal of movement of the carriage. The slide H22 (Figs. 26–30) contains a longitudinal slot H26 which divides its operative edge into an upper flange H27 and a lower flange H28. When the clutch member G6 is positioned to drive the traverse worm in either direction, the slide H22 is at one end of its travel and the stud H20 rests on the lower flange H28 at one side of a central cut-out H29 therein, as shown in Fig. 28. When the slide is moved to the other end of its travel by the shifting of the clutch member G6, the stud H20 passes through the cut-out H29, permitting the disk H21 to make one revolution, and then strikes the lower flange H28 at the other side of the cut-out H29. At each such revolution of the disk H21 and shaft H13 the feed worm H is turned an amount which depends on the adjustment of the adjustable crank pin H30, and which may be varied by adjusting the crank pin H30 to vary the throw of the connecting rod H31 of the ratchet reducing mechanism H14. The upper flange H27 of the slide H22 has two cut-outs H32 and H33, which permit the passage of the stud H20 when the slide is at either end of its travel, and an obstruction H34 between the cut-outs, which is engaged by the stud H20 in case, through a failure of the clutch shifting means, the slide H22 should be moved to release the stud and then remain in such intermediate position (see Fig. 29). This prevents any continuous feeding movement which might otherwise occur under these circumstances with resulting damage to the tool and the work.

The power shaft L and the work shaft B are most desirably both driven from a single electric motor L1, so that the rotation of the work shaft as well as that of the power shaft L may be stopped by merely cutting off current to this motor. The motor L1 carries a sprocket L2 connected by a driving chain L3 to a sprocket L4 on the work shaft. Another sprocket L5 on the work shaft is connected by a similar chain L6 to a sprocket L7 on the power shaft L.

Different arrangements of electrical circuits may, of course, be provided in order to control the operation of the solenoids K1, K2 by means of a flow of current between the feeler E and the two parts of the pattern F, as well as by means of the two emergency switches E4, E5, and to stop the motor L1 by means of a flow of current when the feeler makes contact with the two parts of the pattern simultaneously, or by means of the emergency switch E22. The circuits may be arranged for either direct or alternating current.

An illustrative practical arrangement of circuits now considered best is shown diagrammatically in Fig. 35. The arrangement shown is designed for use with a three-phase alternating current supplied over lines M1, M2, M3. The three lines are connected with the motor L1 through a normally open triple switch MS operated by a relay coil 2c in a motor control circuit 2. The circuit 2 extends from the line M2 through the coil 2c to a terminal 2t where it divides into two branches 2a and 2b. The circuit 2 between the line M2 and the branching point 2t contains a normally closed switch 2s connected to be opened by a relay coil 8c in a circuit to be described. The branch 2a extends to the line M3 and contains a normally open manually operated switch 2as. The branch 2b connects through a lead M4 to the line M1 and contains a normally closed manually operated switch 2bs and the emergency switch E22 connected in series in the circuit.

The current for operating the solenoids K1 and K2 is taken from the lines M1 and M2 through leads M4 and M5 respectively, to which are connected the circuit 3 of the solenoid K1 and the circuit 4 of the solenoid K2. The leads M4 and M5 are desirably connected to receive their current through the main switch Ms so that this switch may serve as a master switch controlling the supply of current to all parts of the machine. The supply of current to the two solenoids is controlled by two normally open double switches 3s and 4s respectively. The switch 3s is controlled by a relay coil 5c in a control circuit 5 which extends from the lead M5 (which is connected with the line M2) through the coil 5c and to a terminal or branching point 5t from which the circuit extends in two branches. One branch 5a extends through a normally open manually operated switch 5as and is connected with the branch 2a of the circuit 2 through which connection is made to the line M3. The manually operable switch 5as thus provides means whereby the solenoid K1 may be energized independently of the feeler E. The other branch 5b of the circuit 5 extends from the terminal 5t to the solenoid operated switch K11 (which is mechanically operated to open the control circuit 5 as the solenoid core completes its movement toward the solenoid K1 and is operated to close the circuit 5 as the core completes its movement toward the solenoid K2), and thence through a normally open switch 5bs controlled by a relay coil 7ac in a control circuit hereinafter described, and through a normally closed manually operable switch 5bs', and thence to the line M1. A shunt 5ba connected across the branch 5b of the circuit 5 contains the normally open emergency switch E4.

The switch 4s which controls the supply of current to the solenoid K2 is controlled by a relay coil 6c in a control circuit 6 which extends from the lead M4 (which is connected with the line M1) through the coil 6c and to a terminal or branching point 6t from which the circuit extends in two branches. One branch 6a extends through a normally open manually operated switch 6as and through 5a and 2a to the line M3, so that the solenoid K2 may be energized independently of the feeler E by closing the manually operable switch 6as. The other branch 6b of the circuit 6 extends from the terminal 6t to the solenoid operated switch K12 (which is mechanically operated to open the control circuit 6 as the solenoid core completes its movement toward the solenoid K2 and is operated to close the circuit 6 as the core completes its movement toward the solenoid K1) and thence through a normally open switch 6bs controlled by a relay coil 7bc in a control circuit hereinafter described, and through a normally closed manually operated switch 6bs', and thence to the line M2. A shunt 6ba connected across the branch 6b of the circuit 6 contains the normally open emergency switch E5.

The circuits thus far described, all being directly connected between two of the lines M1, M2, M3 are operated at a relatively high voltage, for example, 220 volts, so that any slight dust or corrosion which collects on the terminals of the switches is immediately burned off and does not interfere with the operation. The relay coils 7ac and 7bc which control the switches 5bs and 6bs in the solenoid control circuits are operated by circuits 7, 7a and 7, 7b each of which includes the feeler E and one of the two sides F30 and F31 of the pattern F. A compartively low voltage, for example, 10 volts, is used in these circuits so as to prevent arcing between the feeler and the pattern. The low voltage current is supplied by a transformer TR. The high voltage primary coil 10 of this transformer is connected between the branches 5b and 6b of the solenoid control circuits beyond the switches 5bs and 6bs, so that it will receive high voltage current directly from the supply lines M1 and M2. One terminal of the secondary coil 11 of the transformer is connected to the feeler E by the lead 7, while the other terminal of this coil is connected by 7a to the side F30 of the pattern and by 7b to the side F31 of the pattern. The branch 7a contains the relay coil 7ac, while the branch 7b contains the relay coil 7bc, so that contact between the feeler E and the part F30 of the pattern closes the switch 5bs and operates the solenoid K1, while contact between the feeler E and the part F31 of the pattern closes the switch 6bs and operates the solenoid K2.

The relay coil 8c which opens the switch 2s in the motor control circuit 2 is connected in a shunt 8 between the branches 5b and 6b of the solenoid control circuits 5 and 6, so that if both the switches 5bs and 6bs are closed at the same time, this shunt circuit will be connected directly with the supply lines M1 and M2 through the branch lines 5b and 6b, and the coil 8c will be energized to open the switch 2s and thereby cause the main switch M2 to open, stopping the motor and also cutting off the supply of current to the solenoid energizing circuits 3 and 4.

The shunt circuit 8 would also be connected directly with the supply lines M1 and M2 through the leads M4 and M5 and the main lines of the circuits 5 and 6 and branches 5b and 6b if the switches K11 and K12 were both closed at the same time. By the flow of current through the circuit thus completed, not only would the coil 8c be energized to open the motor control circuit 2, but the coils 5c and 6c would also be energized to close the switches 3s and 4s in both the solenoid energizing circuits 3 and 4. The switches K11 and K12 are therefore arranged so that when either of these switches is closed the other must be open. They are, as before pointed out, automatically operated by the solenoid core bar so that when the core bar is moved by the solenoid K2, the switch K11 in the control circuit 5 for the solenoid K1 will be closed and the switch K12 will be opened as the bar reaches the end of its movement, and when the solenoid core bar is attracted by the solenoid K1, the switch K12 in the control circuit 6 for the solenoid K2 will be closed and the switch K11 opened as the bar comes to the end of its movement. The proper one of the switches K11 and K12 will thus always be closed in the control circuit of the solenoid which is to be energized to cause reversal of movement of the tool carriage at the end of its traversing movement in either direction.

The machine is started in operation by closing the hand switch 2as, thereby closing the motor control circuit 2 through the branch 2a and energizing the coil 2c to close the main switch Ms to supply current to the motor and to the solenoid energizing circuits 3 and 4. By the closing of the main switch, the circuit 2 receives current through the branch 2b and the coil 2c then continues to be energized to hold the main switch closed so long as the switches 2s, 2bs and E22 all remain closed. The starting switch 2as opens automatically when released by an operator, so that the main switch Ms will be opened and operation of the machine stopped if either of the switches 2s, 2bs or E22 is opened.

The main switch being closed and the double switch 5bs', 6bs' being closed, the solenoid K1 will be energized to shift the clutch member G6 to reverse the direction of traversing movement of the tool carriage, and to move the feed control slide H22, whenever the feeler E makes contact with the pattern member F30, and the solenoid K2 will be energized to shift the clutch member G6 in the opposite direction to make opposite reversal of the traversing movement of the tool carriage, and to move the feed control slide in the opposite direction, whenever the feeler E makes contact with the pattern member F31. If through failure of the low voltage circuit containing the feeler, either solenoid should not be energized when the feeler makes contact with the corresponding pattern part, then the emergency switch E4 or E5, as the case may be, will be operated as hereinbefore explained to close the solenoid control circuit in which it is located. The solenoids may also be energized at will by means of the manually operable switches 5as and 6as by which the control circuits 5 and 6 are closed through the branches 5a and 6a. Manual operation of the solenoids by means of these switches is not dependent upon the double switch 5bs' and 6bs' being closed. Unless otherwise stopped, the machine will continue to operate, the tool being fed forward at each reversal of traverse of the carriage as hereinbefore explained, until the feeler reaches the deepest point of the pattern and makes simultaneous contact with both parts of the pattern, whereupon the two switches 5bs and 6bs in branches 5b and 6b of the two solenoid control circuits will be closed and the coil 8c will be energized to open the switch 2s to cause the main switch Ms to open, thereby stopping the machine. The machine will also be stopped if through pressure of the feeler E against the work the emergency switch E22 is, as hereinbefore explained, opened; and the machine may be stopped at any time at will by opening the hand switch 2bs.

While a special feature of the machine described is the automatic control of the traversing and feeding movements of the tool, the reversal of the traversing movements of the carriage and the tool and the feeding of the tool through the agency of the solenoids may be controlled manually, or the carriage and the cross slide may, if desired, be manually operated. Even when so used, the machine offers great advantages in the way of safety and efficiency over the devices heretofore used for dressing grinding wheels.

The solenoids K1 and K2, which actuate the carriage reversing clutch and the cross-slide feed control means, may be controlled manually by means of the switches 5as and 6as to cause a reversal of the movement of the carriage and feeding of the cross-slide at desired points, the switches 5bs' and 6bs' being opened, or the end of the feeler E being turned up out of operative position so as not to engage the pattern, or no pattern being mounted on the pattern table, so that automatic energizing of the solenoids shall not take place. By separating the two halves of the feed nut G1 by means of a control lever G15 (Fig. 9), the tool carriage C may be disconnected from the traverse worm G, and the carriage may then be moved by means of a hand wheel G16 on a shaft which carries a pinion G17 meshing with a gear G18 on a sleeve carrying a pinion G19 which meshes with a rack G20 mounted on the main bed A1 (Figs. 8 and 9). By pushing in a finger piece H35 (Fig. 10) on the shaft which carries the pinion H4, this pinion may be moved out of engagement with the gear H5, and the feed worm H will thereby be released so that it may be turned by means of a hand wheel H36 fixed on the outer end of the worm shaft. The cross slide C2 may then be moved in either direction of its movement by means of the hand wheel. The tool carriage and the cross slide may be moved by means of the hand wheels G16 and H36 for setting the tool in any desired position with relation to the work; and, if desired, the carriage and cross slide may be moved manually by means of the hand wheels G16 and H36 to shape the work, power being used in such manual operation of the machine only for driving the work shaft.

To facilitate such manual operation of the machine, means are provided for holding a templet N directly over the work where the operator may see it through the window in the casing. Such means, illustrated in Figs. 3, 33, 34, 35, include a standard N1 mounted on the housing of the bearing B1 and carrying a vertically movable slide N2, which carries a horizontal bar N3 projecting over the casing and carrying adjustable clamping means N4 for holding the templet N. By lowering the slide N2 by means of a rack N5 and pinion N6, the templet may be inserted through a slot N7 (Fig. 7) in the cover J3, and brought directly above the work to serve as a guide in the dressing operation. By lowering the slide still further, the templet may be brought in contact with the work to test the accuracy with which the work has been dressed.

The automatic control mechanism described is capable of general application in cutting or grinding machines of the lathe type. Other features of the invention are embodied in the machine illustrated, which are of especial value in the dressing of grinding wheels, but which may also be used in machines for shaping other materials, will now be described.

To provide for accurate dressing of grinding wheels, it is desirable, because of their weight and to secure a rigid support, that they be mounted on a shaft supported by bearings at each end. Special provision must, therefore, be made for placing the grinding wheels on the shaft and removing them therefrom.

In the machine illustrated, the work shaft B is mounted in three bearings B1, B2, and B3, which are most desirably ball bearings, B1 and B2 being self-aligning bearings and B3 being a deep groove bearing. The bearings B1 and B2 support the left hand end of the shaft and are carried by fixed standards A3 and A4 extending upward from the bed of the machine. The bearing B3 supports the right hand end of the shaft and is carried by a movable standard A5 which is mounted to slide on a bed block B4 on the machine bed at the right hand end thereof. The bed block B4 is provided with a longitudinal guideway B5 for the base of the standard near its front side and carries at its rear side a longitudinal guide and hinge rod B6 to which the base of the standard is connected by means of a sliding hinge sleeve B7. The standard is thus mounted so that it may be moved outward to the right from the position shown in Figs. 1, 2 and 5 sufficiently to carry the bearing beyond the end of the shaft, and may then be tilted backward, as illustrated by Fig. 4 but to a greater degree, to move the bearing out of line with the shaft so as to permit the work to be placed on the shaft and to be removed therefrom. A rack B8 on the bed rock B4 and a pinion B9 carried by a shaft mounted in bearings at the base of the standard A5 provide means for moving the standard when seated on the bed block. The standard is locked in operative position by means of a bolt B10 which extends through a hole in the bottom of the standard and into a longitudinal slot B11 in the bed block having shoulders B12 for engaging the head of the bolt and which end short of the outer end of the bed block as shown in Fig. 2 so as to permit the bolt to be lifted out of the slot when the standard is tilted backward after having been moved out to carry the bearing beyond the end of the shaft.

The inner race of the movable ball bearing B3 is mounted on a sleeve B15 which forms a part of the bearing assembly and which is formed to seat on the end of the work shaft when the bearing is moved to its operative position and to slide off from the end of the shaft when the standard and bearing are moved off to the right away from the end of the shaft. Most desirably, the end of the shaft is made cylindrical and of slightly reduced diameter to provide a shoulder, as shown in Fig. 31, against which the end of the bearing sleeve B15 is held by a nut B16 screwed on the threaded end of the shaft. The end of the shaft is best provided with a key B17 to enter a slot in the sleeve B15 to positively prevent relative rotation between the shaft and the sleeve.

When the bearing B3 is withdrawn from the end of the work shaft, the unsupported end of the shaft will drop slightly if there is any play in the bearings B1 and B2. A hand lever B20 removably mounted on a pin B21 projecting from the inner side of the standard A5 provides a convenient means for raising the right hand end of the shaft into alignment with the bearing sleeve B15 when the bearing is being moved into operative position.

A single grinding wheel of any desired diameter and axial length within the capacity of the machine may be mounted on the work shaft. Usually, however, the work or body of material to be shaped will, as shown in Figs. 1 and 5, be made up of a plurality of grinding wheels of various diameters and thickness according to the shape of the article for grinding which they are to be used and the corresponding shape to which they are to be formed. The grinding wheels are locked on the work shaft between a shoulder B25 near the left hand end of the shaft and a nut B26 screwed on a threaded portion of the shaft near the right hand end thereof.

The tool holder D1 is formed by a rigid plate mounted to stand vertical and transversely of the machine on the cross slide C2 at the front end of the slide. The plate is secured to the cross slide by having its bottom edge rabbeted and fitted in an undercut groove D2 in the top of the slide, and is additionally supported and strengthened by means of brackets D3 bolted or riveted to the plate and to the top of the slide, one on either side of the plate near the forward edge thereof. The dressing tool D, which is usually a diamond, is mounted to project from the rear edge of the plate near the upper corner thereof. The plate is of such height that the tool is carried at or about the level of the axis of the work shaft, and its width or dimension transversely of the machine is somewhat greater from the rear edge of the brackets D3 to the rear edge of the plate than the maximum feeding movement made by the slide C2.

It is desirable that the work and the dressing tool shall be completely enclosed to confine the dust produced during the operation of the machine. For this purpose, a casing is provided for the work and cutting tool as follows:—The bottom portion of the casing is formed by a box-shaped pan P1 located directly beneath the bed A1 of the machine. The rear side of the casing is formed by a fixed cylindrically curved casing member P2 mounted on the bed of the machine. The top of the casing is formed by a curved cover P3 which is hinged to the casing member P2 and which carries end casing members P4 and P5. The ends of the casing are completed by rear end casing members P6 and P7 secured to the standards A4 and A5 respectively, and by front end casing members formed by shields P8 and P9 secured to and projecting forwardly from the standards A4 and A5 respectively. The right hand end of the hinge pivot P10 is tapered so that it may easily enter a bearing P11 provided for it in the end casing P7 which is carried by the movable standard A5. The hinged cover P3 is provided with a window P12. In front of the work below the front edge of the hinged cover, there is a shield P13 mounted on the tool carriage C and extending over the slide C2 and containing a vertical slot through which the tool-carrying plate D1 extends and may move inwardly and outwardly. Spring-pressed rollers P14 mounted on the shield P13 bear against the plate D1 and serve to hold it centrally within the slot in the shield and to reduce vibration or chattering of the plate. Two curtains P15 and P16 have their inner end portions secured and wound on vertical spring rollers P17 and P18 mounted on brackets at the edges of the shield and extending down through the opening in the top wall of the bed A1 to bring the bottom edge of the curtains close to the bottom wall of the bed. The outer end of the left-hand curtain P15 is attached to pins P19 provided on the shield P8 which projects forwardly from the fixed standard A4. The outer end of the right-hand curtain P16 passes around a post P20 removably fixed in the bed of the machine and is secured by pins P21 to the shield P9 which projects from the movable standard A5. At the rear side of the machine between the bottom wall of the bed of the machine and the lower edge of the casing P2, are two similar curtains P25 and P26 whose outer ends are secured to, and rolled on, vertical spring rollers P27 and P28 mounted on the bed of the machine, and whose inner ends are secured to opposite sides of the tool carriage near the rear end thereof. It is apparent that as the tool carriage is traversed toward the right, the right-hand curtains P16 and P26 are rolled on their spring rollers and the left-hand curtains P15 and P25 are unrolled, and while the carriage is traversed toward the left, the reverse occurs. Consequently, the curtains in no way interfere with the movement of the tool carriage.

A blower P30 driven by the motor L1 is provided for removing dust from the enclosed space in which the work and tool are located. The blower is connected by means of a flexible tube P31 entering one end of the pan P1 with an opening P32 in the cross slide C2 of the tool carriage located directly under the tool. Since in the operation of the machine, the work shaft is rotated so as to move the front side of the work downward, the greater part of the dust produced is projected downwardly towards this opening and is withdrawn by the blower. A little dust collects in the bottom of the pan P1 and may be removed through a clean-out opening closed by a door P33.

What I claim is:

1. In a machine having a tool, the combination of automatic means for causing the tool to make a succession of closely spaced parallel straight cuts, a pattern, and automatic means cooperating with the pattern to determine the length of each cut so as to reproduce the outline of the pattern upon the work.

2. In a machine having a tool and means for causing traversing movement thereof, the combination of a pattern, a feeler movable with the tool, and means controlled by the feeler for reversing the direction of the traversing movement of the tool and causing a slight feeding movement thereof when the feeler reaches the edge of the pattern.

3. In a machine having a tool and means for causing traversing movement thereof, the combination of a pattern, a feeler movable with the tool, and means controlled by the feeler for reversing the direction of the traversing movement of the tool when the feeler reaches the edge of the pattern, and automatic means for causing a feeding movement of the tool on each reversal of its traversing movement.

4. In a machine of the lathe type having means for rotating the work and a tool, the combination of means for causing the tool to make a succession of closely spaced straight cuts parallel to the axis of the work, a pattern and automatic means cooperating with the pattern to determine the length of each cut so as to reproduce the outline of the pattern upon the work.

5. In a machine of the lathe type having means for rotating the work, a tool, and means for causing traversing movement of the tool in directions parallel to the axis of the work, the combination of a pattern, a feeler mounted to have a movement corresponding to the traversing movement of the tool, means for reversing the direction of traversing movement of the tool when the feeler reaches the edge of the pattern, and means for causing a feeding movement of the tool toward the axis of the work on each reversal of its traversing movement.

6. A machine for dressing grinding wheels, comprising a rotary work shaft for holding the grinding wheels, a dressing tool, means for causing traversing movement of the dressing tool in directions parallel to the axis of the work shaft, a feeler mounted to move with the tool, a pattern positioned to be engaged by the feeler, means for reversing the direction of movement of the tool when the feeler reaches the edge of the pattern, and means for causing an inward feeding movement of the tool on each reversal of its traverse.

7. A machine of the lathe type comprising in combination a rotary work shaft, a tool holder, means including a reversing clutch for causing a traversing movement of the tool holder in directions parallel to the axis of the work shaft, an electrically conductive feeler mounted to have a movement corresponding to the movement of the tool holder, an electrically conductive pattern positioned to be engaged by the feeler, said conductive members being connected as terminals in an electric circuit, electro-magnetic means controlled by said circuit for operating said clutch, whereby when the feeler makes contact with the pattern the clutch will be operated to reverse the movement of the tool holder, and means for causing a feeding movement of the tool holder toward the axis of the work shaft on reversal of the traversing movement of the tool holder.

8. In an automatic machine, the combination of a tool-carrying member, means for causing reciprocating movement of said member, an electrically conductive feeler mounted on said member and movable with respect thereto in a direction parallel to the reciprocating movement thereof, resilient means for normally restraining said feeler against movement with respect to said member, an electrically conductive pattern, the feeler and the pattern being connected as terminals in an electric circuit, means controlled by said circuit for causing reversal of the direction of movement of the tool-carrying member when the feeler makes contact with the pattern, a safety switch operable by relative movement between the feeler and the tool-carrying member, and electrical connections controlled by said switch for causing reversal of the direction of movement of the tool-carrying member.

9. A machine of the lathe type, comprising in combination a rotary work holder, a tool carriage movable parallel to the axis of the work holder, means for moving the tool carriage, a cross-slide on the tool carriage, a tool holder on the cross-slide, an electrically conductive feeler mounted on the cross-slide and movable with respect thereto in directions parallel to the movement of the tool carriage, resilient means normally restraining the feeler against movement with respect to the cross-slide, an electrically conductive pattern positioned to be engaged by the feeler, the feeler and the pattern being connected as terminals in an electric circuit, means controlled by said circuit for causing reversal of the direction of movement of the carriage when the feeler touches the pattern, a safety switch operable by movement of the feeler with respect to the cross-slide, and electrical connections controlled by said switch for causing reversal of the direction of movement of the carriage.

10. An automatic machine having a tool, means for causing the tool to make a succession of closely spaced parallel straight cuts, a pattern, automatic means cooperating with the pattern to determine the length of each cut so as to reproduce the outline of the pattern upon the work, and automatic means for stopping all movement of the tool when the work has been formed to such shape.

11. In a machine having a tool and means for causing traversing movement of the tool, the combination of a feeler mounted to have a movement corresponding to the movement of the tool, a pattern positioned to be engaged by the feeler, means for reversing the direction of the traversing movement of the tool when the feeler crosses the edge of the pattern, means for causing feeding movement of the tool, and automatic means for stopping all movement of the tool when the feeler reaches the deepest point of the pattern.

12. In a machine having a work holder and a tool holder, and means for causing a traversing movement of the tool holder, and means for feeding the tool holder toward the work, the combination of an electrically conductive feeler mounted to have movements corresponding to the movements of the tool holder, an electrically conductive pattern positioned to be engaged by the feeler at each end of each traverse of the tool holder, the pattern comprising two parts insulated from each other and each connected to form a contact terminal of an electric circuit of which the feeler forms a coacting contact terminal, means controlled by said circuits for causing reversal of the traversing movement in one direction when the feeler makes contact with one part of the pattern and reversal of the traversing movement in the other direction when the feeler makes contact with the other part of the pattern, means providing an electric circuit of which the two parts of the pattern form terminals, and means controlled by said last mentioned circuit for stopping the machine when the feeler makes contact with both parts of the pattern to close said circuit.

13. A machine of the lathe type having means for rotating the work, a tool carriage, means for causing a traversing movement of the tool carriage in directions parallel to the axis of the work, a cross-slide on the tool carriage, a tool holder on the cross-slide, a feeler mounted on said cross-slide for movement relative thereto in a direction perpendicular to the axis of the work, a spring normally restraining the feeler against inward movement, a pattern positioned to be engaged by said feeler, means for reversing the direction of traverse of the tool carriage when the feeler engages the pattern, means for causing feeding movement of the tool toward the pattern, and means for stopping all movement of the tool holder when the feeler by pressure against the pattern is moved inward relatively to the cross-slide.

14. A machine of the lathe type, comprising a rotary work holder, a tool carriage mounted to reciprocate in directions parallel to the axis of the work holder, a cross-slide mounted on the tool carriage, a tool holder carried by the cross-slide, a feeler carried by the cross-slide, a pattern having an outline corresponding to that to be formed on the work and cooperating with the feeler to control the movement of the carriage, and means for bodily adjusting the position of the pattern both longitudinally and transversely of the machine without changing the outline of the pattern to position the pattern in desired relation to the work.

15. A machine of the lathe type, comprising a rotary work holder, a tool carriage, means for causing a traversing movement of the tool carriage in directions parallel to the axis of the work holder, a cross-slide on the tool carriage, a tool holder on the cross slide, feeding means for causing feeding movement of the cross-slide, a pattern, a feeler mounted on the cross-slide in a position to engage the pattern at the end of traversing movements of the carriage and adjustable to an inoperative position in which it will not engage the pattern, electro-magnetic means controlled by the feeler for controlling the movements of the carriage and cross-slide, and means for manually moving the carriage and the cross-slide to adjust the position of the tool with relation to the work.

16. In a machine of the class described, the combination with a work holder, a tool holder, and means for causing relative movement between the work holder and the tool holder, of an electrically conductive feeler mounted to have a movement corresponding to the relative movement between the work holder and the tool holder; a pattern table having spaced parallel guideways, an insulated cross bar mounted to slide on said guideways, a metal templet carried by the cross bar and adjustable longitudinally thereof and forming a pattern member, a contact strip extending adjacent to one of said guideways, and a contact member engaging said contact strip to electrically connect the cross bar and the templet with said strip; and an electric circuit connecting the feeler with said contact strip, and means connected in said circuit for controlling the relative movement between the work holder and the tool holder.

17. In a machine of the class described, the combination with a work holder, a tool holder, and means for causing relative movement between the work holder and the tool holder, of an electrically conductive feeler mounted to have a movement corresponding to the relative movement between the work holder and the tool holder; a pattern table having spaced parallel guideways, two insulated cross bars mounted to slide on said guideways, oppositely facing metal templets carried one by each of said cross bars and forming two parts of a pattern, two contact strips extending parallel to said guideways, a contact member engaging one of said contact strips to electrically connect one of the cross bars and the templet carried thereby with said strip, and a contact member engaging the other contact strip to electrically connect the other cross bar and the templet carried thereby with said other contact strip; electric circuits connecting the feeler with the contact strips respectively, and means connected in said circuits for controlling the relative movement between the work holder and the tool holder.

18. In a machine of the lathe type having a longitudinally movable tool carriage and a cross slide on the tool carriage, the combination of traversing means for causing traversing movements of the carriage, feeding means for causing feeding movement of the cross-slide, driving means, connecting means between the driving means and the traversing means including a reversing clutch, means for reversing said clutch in predetermined positions of the carriage, connecting means between the driving means and the feeding means including a friction clutch, means normally holding the feeding means against movement, and means actuated on the shifting of said reversing clutch momentarily to release said holding means.

19. A machine for dressing grinding wheels, having a rotary work shaft for carrying said wheels, a longitudinally movable tool carriage, a cross-slide on the tool carriage, a plate mounted on the cross-slide and standing in a plane at right angles to the axis of the work shaft, a dressing tool at the inner edge of said plate, and a shield mounted on the tool carriage in front of the work shaft, extending over the cross-slide and containing a slot for the passage of said plate.

20. A machine for dressing grinding wheels, having a rotary work shaft for carrying said wheels, a longitudinally movable tool carriage, a cross-slide on the tool carriage, a plate mounted on the cross-slide and standing in a plane at right angles to the axis of the work shaft, a dressing tool at the inner edge of said plate, a shield mounted on the tool carriage in front of the work shaft and containing a slot for the passage of said plate, and spring-pressed rollers mounted on said shield at opposite sides of said slot and engaging said plate.

21. A machine for dressing grinding wheels, comprising a rotary work shaft for carrying said wheels, a longitudinally movable tool carriage, a cross-slide on the tool carriage, a tool mounted on the cross-slide, a shield mounted on the carriage in front of the tool, a top casing member covering the work shaft above said shield, end casing members, curtains extending between said top casing member and the bed of the machine and between said shield and the end casing members, and a vertical spring roller for each of said curtains to which one end of the curtain is secured, whereby the curtains will wind on and unwind from said rollers during the traverse of the tool carriage.

22. In a machine of the class described, the combination with a work holder, a tool holder, and means for causing relative movement between the work holder and the tool holder, of an electrically conductive feeler mounted to have a movement corresponding to the relative movement between the work holder and the tool holder; a pattern table having an insulated metal socket plate formed with a multiplicity of closely spaced sockets for receiving contact plugs, an insulated cross bar mounted to slide above the socket plate, a metal templet carried by the cross bar and adjustable longitudinally thereof and forming a pattern member, a contact strip, a contact member engaging said strip to connect the cross bar and the templet with said strip, and plugs adapted to serve as contact terminals inserted in some of said sockets at one side of the templet and forming the remainder of the pattern; electric circuits connecting the feeler with said contact strip and the socket plate respectively, and means connected in said circuits for controlling the relative movement between the work holder and the tool holder.

23. In a machine of the class described, the combination with a work holder, a tool holder, and means for causing relative movement between the work holder and the tool holder, of an electrically conductive feeler mounted to have a movement corresponding to the relative movement between the work holder and the tool holder; a pattern table having an insulated metal socket plate provided with a multiplicity of closely spaced sockets for receiving contact plugs, a pattern member mounted above the socket plate, and plugs adapted to serve as contact terminals inserted in some of said sockets at one side of said pattern member and forming the remainder of the pattern; electric circuits connecting the feeler with said pattern member and the socket plate respectively, and means connected in said circuits for controlling the relative movement between the work holder and the tool holder.

24. In a machine of the class described, the combination with a work holder, a tool holder, and means for causing relative movement between the work holder and the tool holder, of an electrically conductive feeler mounted to have a movement corresponding to the relative movement between the work holder and the tool holder, a pattern table having a socket plate provided with a multiplicity of closely spaced sockets for receiving contact plugs and formed of an insulated metal plate and a cover plate of insulating material, a pattern member consisting of a plurality of thin metal strips set on edge on said cover plate and held flatwise together and arranged so that their front ends form the outline to be cut on the work, plugs adapted to serve as contact terminals inserted in some of said sockets opposite the front edge of said strips and forming the remainder of the pattern, electric circuits connecting the feeler with said metal strips and with the socket plate respectively, and means connected in said circuits for controlling the relative movement between the work holder and the tool holder.

25. In a machine of the class described, a work holder, a tool holder, means for causing relative movement between the work holder and the tool holder, an electrically conductive feeler mounted to have a movement corresponding to the relative movement between the work holder and the tool holder, a pattern table having a supporting surface of insulating material, an edge piece of conductive material at each side of the table, a pattern consisting of a plurality of thin metal strips set on edge on the table and held between said edge strips and arranged so that their front ends form the outline to be cut on the work, and an insulating strip inserted among said metal strips at the deepest part of the pattern, said strips filling the space between said edge pieces so that the strips on one side of said insulated strip are electrically connected to one of said edge pieces and those at the other side to the other of said edge pieces, electric circuits connecting the feeler with said edge pieces respectively, and means connected in said circuits for controlling the relative movement between the work holder and the tool holder.

In testimony whereof I have hereunto set my hand.

JOHN SHEARMAN DONALDSON.